United States Patent
Chavoshi

(10) Patent No.: US 12,499,756 B2
(45) Date of Patent: Dec. 16, 2025

(54) SYSTEM AND METHOD FOR VEHICLE TRAFFIC SIGNALING

(71) Applicant: Metra Sign Inc., Waterloo (CA)

(72) Inventor: Mohammad Chavoshi, Kitchener (CA)

(73) Assignee: Metra Sign Inc., Waterloo (CA)

( * ) Notice: Subject to any disclaimer, the term of this patent is extended or adjusted under 35 U.S.C. 154(b) by 0 days.

(21) Appl. No.: 19/025,704

(22) Filed: Jan. 16, 2025

(65) Prior Publication Data

US 2025/0157330 A1    May 15, 2025

Related U.S. Application Data

(63) Continuation of application No. 18/420,993, filed on Jan. 24, 2024, now Pat. No. 12,230,130, which is a continuation of application No. PCT/CA2022/051172, filed on Jul. 29, 2022.

(60) Provisional application No. 63/227,715, filed on Jul. 30, 2021.

(51) Int. Cl.
　　*G08G 1/07*　　(2006.01)
　　*G01S 13/91*　　(2006.01)

(52) U.S. Cl.
　　CPC .......... *G08G 1/07* (2013.01); *G01S 13/91* (2013.01)

(58) Field of Classification Search
　　CPC .................. G08G 1/07; G01S 13/91
　　See application file for complete search history.

(56) References Cited

U.S. PATENT DOCUMENTS

| | | | |
|---|---|---|---|
| 5,070,334 A | * | 12/1991 | Commissaire .......... G01S 7/023 342/125 |
| 5,117,301 A | | 5/1992 | Tsumura |
| 5,680,136 A | | 10/1997 | Chekroun |
| 6,081,223 A | | 6/2000 | Kitahara et al. |

(Continued)

FOREIGN PATENT DOCUMENTS

| | | |
|---|---|---|
| CN | 111987469 A | 11/2020 |
| DE | 4419893 A1 | 12/1995 |

(Continued)

OTHER PUBLICATIONS

CIPO, International Search Report and Written Opinion, dated Nov. 18, 2022. PCT Application No. PCT/CA2022/051172, 12 pages.

(Continued)

*Primary Examiner* — Sisay Yacob
(74) *Attorney, Agent, or Firm* — Own Innovation; James W. Hinton; Caitlin O'Flynn

(57) ABSTRACT

A radar traffic sign apparatus is provided comprising an electronic or a motorized radar traffic sign. The electronic sign has at least one metasurface to shape complex configurations such as plane and/or corner reflectors. Each metasurface has a top layer of PCB board for controllable elements, a ground layer, and biasing means comprising diodes or switches. The state of the sign can be changed by the elements attached to the top layer. A bias voltage applied at the biasing means causes states of at least one element to change, and an operation mode of the metasurface to switch. The motorized sign may include multiple planes to shape a specific corner reflector with proper RCS. The direction or opening of a motorized sign can be controlled. The radar traffic sign has an ON mode to reflect the radar signal, and an OFF mode where the radar signal is not reflected.

9 Claims, 28 Drawing Sheets

(56) References Cited

U.S. PATENT DOCUMENTS

| | | | | |
|---|---|---|---|---|
| 2019/0146082 | A1* | 5/2019 | Cohen | H01Q 1/2225 |
| | | | | 342/70 |
| 2019/0250269 | A1* | 8/2019 | Miu | G05D 1/021 |
| 2020/0082722 | A1* | 3/2020 | Beiski | G06K 7/10366 |
| 2020/0326460 | A1 | 10/2020 | Kim et al. | |
| 2020/0350691 | A1 | 11/2020 | Somerlock, III et al. | |
| 2021/0080626 | A1 | 3/2021 | Radivojevic et al. | |
| 2022/0091229 | A1* | 3/2022 | Berry | G01S 7/4034 |

FOREIGN PATENT DOCUMENTS

| | | |
|---|---|---|
| DE | 102016101156 | 7/2017 |
| DE | 102018006218 A1 | 1/2019 |
| EP | 3151035 A1 | 4/2017 |
| RU | 2422861 C2 | 6/2011 |
| WO | 2020097095 A1 | 5/2020 |

OTHER PUBLICATIONS

Kalaagi M, Seetharamdoo D. Radar, Cross Section Enhancement using Metasurfaces for Road 1 to 10 and 21 to 27 Safety Applications. In 2022 16th European Conference on Antennas and Propagation (EuCAP), Mar. 2, 20227 (pp. 1-5). IEEE.

Ma Q, Bai GD, Jing HE, Yang C, Li L, Cm TJ. Smart metasurface with self-adaptively reprogrammable functions. Light: science & applications. Oct. 31, 2019;8(1):1-2.

European Patent Office, Extended European Search Report dated Apr. 25, 2025 for EP 22847769.1.

Rizza et al.: "A Millimeter-Wave Reconfigurable Intelligent Metasurface Design for Vehicular Networks Applications", 2020 IEEE 92nd Vehicular Technology Conference (VTC2020-FALL), Nov. 1, 2020, pp. 1-5.

* cited by examiner

900

Corner reflector front faces radar sensor: ON mode

950

Corner reflector back faces radar sensor: OFF mode

SYSTEM AND METHOD FOR VEHICLE TRAFFIC SIGNALING

CROSS-REFERENCE TO RELATED APPLICATIONS

This application is a continuation of U.S. application Ser. No. 18/420,993 filed Jan. 24, 2024, which is a continuation of International Application No. PCT/CA2022/051172 filed Jul. 29, 2022, which claims the benefit U.S. Provisional Application No. 63/227,715 filed Jul. 30, 2021, the complete disclosures of which are incorporated herein by reference.

FIELD

The present disclosure generally relates to vehicles and in particular to systems and methods for traffic signaling.

INTRODUCTION

Road junctions (e.g., road intersections) may be hazardous areas for vehicles, pedestrians, and bicycles. They can be anything from complex freeway interchanges to basic rural right-angle intersections. Intersection collisions are prevalent because traffic is often travelling in multiple directions and there is a notable possibility of a collision. Distracted drivers, irresponsible driving, high speeds, and poor vision can all contribute to a catastrophic junction collision. Whatever the situation, a junction accident may be disastrous, resulting in fatal physical harm and costly car damage.

The most basic collision avoidance systems are intersection traffic signals such as red and green lights, left- and right-turn signals, etc. These traffic signals are quite successful at directing traffic and preventing most intersection accidents. Implementing sensors and other types of detection devices at intersections and predicting the locations and directions of various pedestrians and vehicles, is also a solution to prevent accidents at intersections. In several inventions, particularly autonomous applications, some telecommunication, or radio links such as Vehicle-to-Vehicle (V2V), Vehicle-to-Infrastructure (V2I), and Vehicle-to-Everything (V2X) platforms are applied to connect vehicles to a control centre and other vehicles or even pedestrians to predict any collisions and risky situations.

SUMMARY

In accordance with an aspect, there is provided an electronic radar traffic sign comprising a plurality of metasurfaces to shape a plane reflector or corner reflector or any types of reflector. Each metasurface comprises a top layer of printed circuit board (PCB) board for top elements, a ground layer of PCB, a biasing means in top or additional layer below the ground layer comprises at least one diode or switch, and at least one element attached to the top layer of PCB board, wherein each of the at least one element has at least two states and are controlled by a corresponding biasing means. A bias voltage applied at the at least one biasing means causes states of the elements to change and an operation mode of the metasurface to switch.

In accordance with another aspect, there is provided a motorized radar traffic sign comprising multiple planes to shape a corner reflector. Each plane comprises at least one of a high electric conductor, or a non-high electric conductor having inner walls plated with a good electric conductor.

In accordance with another aspect, there is provided an electronic radar traffic sign apparatus is provided. The apparatus comprises at least a metasurface plane. Each metasurface plane comprises a ground layer of printed circuit board (PCB), a dielectric substrate, a top layer of PCB board, and at least one element connected to the top layer of PCB board. The top layer or additional layer below ground layer includes at least one biasing means. Each of the at least one element has at least two states and are controlled by a corresponding biasing means. A bias voltage applied at the at least one biasing means causes states of the elements to change and an operation mode of the metasurface to switch.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Figure 1:
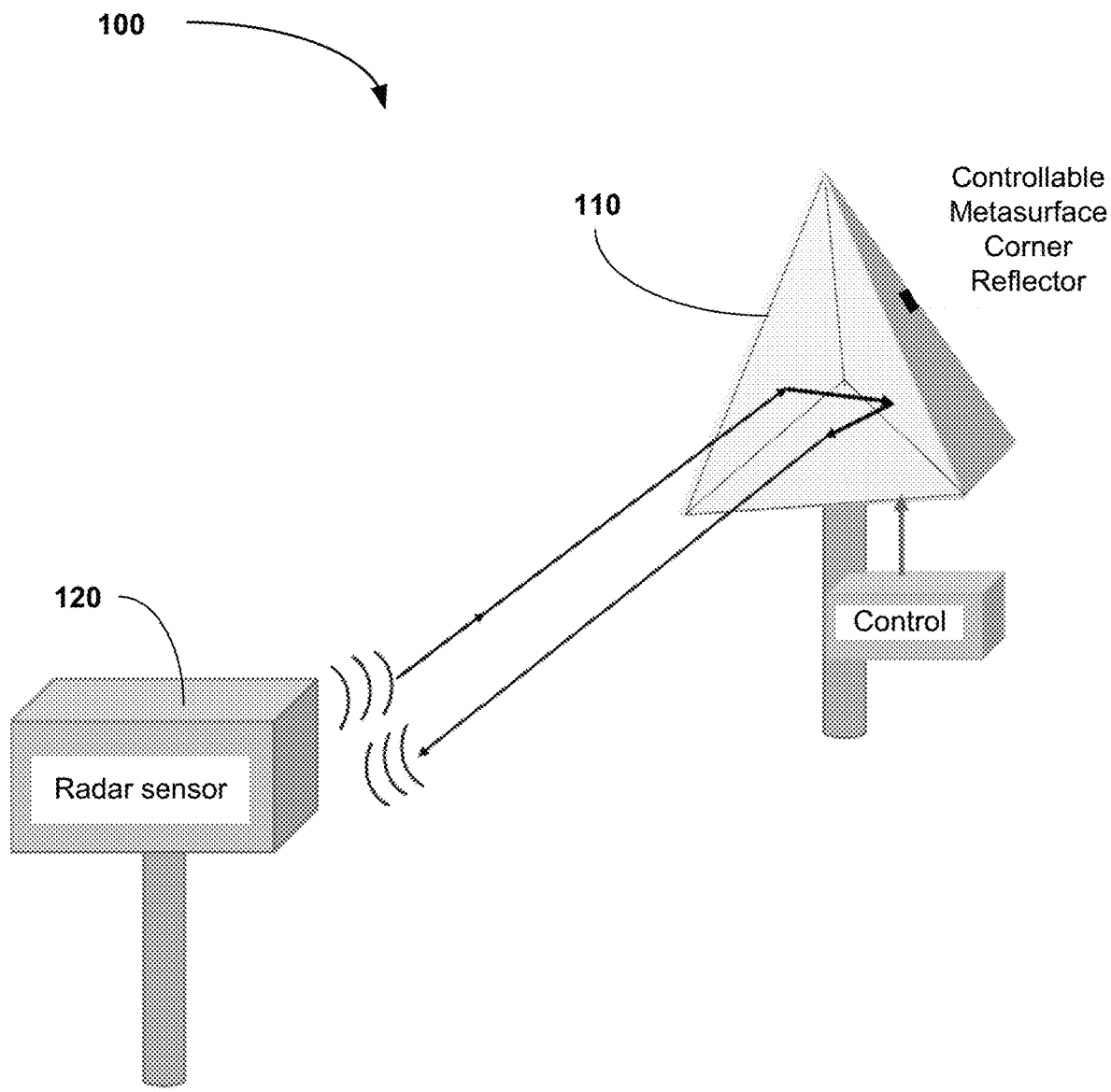
FIG. 1 illustrates an example of a smart metasurface reflector system, in accordance with some embodiments.

Embodiments of methods, systems, and apparatus are described through reference to the drawings. Applicant notes that the described embodiments and examples are illustrative and non-limiting. Practical implementation of the features may incorporate a combination of some or all of the aspects, and features described herein should not be taken as indications of future or existing product plans.

In some embodiments, there is provided an advanced driver-assistance and autonomous vehicle radar traffic sign. A controllable radar traffic sign made of metasurface reflector may operate in the frequency range of, for example the automated vehicle frequency ranges of approximately 24 gigahertz (GHz) to approximately 24.25 GHz, or from approximately 76 GHz to approximately 81 GHz. It should be understood that other frequency ranges may be used. The controllable radar traffic sign may also have at least reflection and non-reflection states. This sign could have different configurations and shapes including but not limited to a single plane reflector, triangular trihedral corner reflector, circular trihedral corner reflector, square trihedral corner reflector or their combinations and sizes to increase its Radar Cross Section (RCS) and create different coded signatures for different radar traffic signs. A radar traffic sign can be used in different applications for vehicles, trains, and drones including but not limited to stop signs and accident early-warning signs.

In some embodiments, a motorized radar traffic sign may comprise inner walls made of electric conductor material. This radar traffic sign can be controlled mechanically and has at least "ON" and "OFF" states. The radar traffic sign can rotate or change its angle, and its ON and OFF states can be changed with a specific rate. In the ON state, it may reflect an incident wave with proper RCS, while in the OFF state, the reflection signal may be very low. This sign could have different configurations and shapes including but not limited to triangular trihedral corner reflector, circular trihedral corner reflector, square trihedral corner reflector or their combinations. The radar traffic sign may be sized to increase its RCS and create different coded signatures for different radar traffic signs. A motorized radar traffic sign can also be used in different applications for vehicles, trains, and drones, including but not limited to stop signs and accident early-warning signs similar to metasurface radar traffic signs.

The situation of a road intersection can be monitored with multiple sensors including but not limited to a short-range radar and a camera. An accident early-warning signal and intersection situation may be monitored in real-time in other vehicles or trains through a point-to-multipoint or Vehicle to Infrastructure (V2I) communication radio link.

The description herein describes embodiments for road motor vehicles, trains and drones. However, the teachings herein may be configured to apply to any vehicle or moving object.

Road Intersection

Radar sensors are used in modern vehicle safety systems in conjunction with cameras, ultrasound, Light Detection and Ranging (LIDAR), and other sensors to obtain information about a vehicle's environment. Radar sensors are used in both autonomous and non-autonomous systems and drivers and pedestrians benefit from these sensors in a variety of ways. Such radar systems could be used for adaptive cruise control, collision warning, automatic distance control, parking assistance, collision warning, and blind spot detection. One advantage of radar over other sensors is its ability to transmit through and penetrate objects and materials, particularly in adverse weather conditions such as heavy rain, foggy weather with low visibility, or snow-covered roads. While such radar systems have been demonstrated to be robust in use, their performance on vehicles and other locations is typically limited by the requirement of relatively large structures to produce enough Radar Cross Section (RCS) for the radar system to detect those structures.

Radar sensors currently provide object position, velocity, and angle, but they do not have high image resolution. For some situations, such as road crossings, high resolution radars with extensive signal processing are required to detect existing small objects, particularly those with low RCS. These sensors are expensive and need more power than other sensors. There is an increasing need to improve sensor systems and methods that enhance vehicle operation and driver visibility in certain environmental conditions.

Railroad Intersection

According to the current state of the art, securing systems such as barriers spanning the entire width of a roadway do not detect the presence of an obstacle. A vehicle, for example, may become stuck while driving across the crossing and come to a halt between the lowered barriers. This situation poses the risk of an accident with an approaching train. Aside from barriers, other warning systems such as audible alerts or flashing red lights are available. Vehicles and pedestrians are only prevented from entering the railroad crossing after these warning signals.

Furthermore, a control centre is usually responsible for the general railway signal system and monitoring trains on the railway. A train must receive a command from the control centre to drive or stop. The parking distance for a train is long due to its high speed and/or momentum. Typically, parking distances range from hundreds of metres to several kilometres, and it takes tens of seconds to stop. If there is a situation that could lead to an accident, the driver must recognise it far away from the intersection to control train speed and stop it before the rail crossing. Most railroad intersections do not have a warning system and enhancing safety levels necessitates an alarming platform that can accurately predict and analyse complex scenarios in order to respond to multiple potential hazards and accidents. This platform should be reliable, real-time, and cost-effective particularly in remote areas.

Metasurface

Metasurfaces (MSs) are optically thin, dense, and two-dimensional arrays of structural elements possessing unusual and useful properties granted by their constitutive elements with usually resonant behavior. A metasurface (MS) can be designed to manipulate incident waves, i.e., reflect, transmit or absorb the incident wave. The required MS interaction with electromagnetic waves can be achieved by proper engineering the characteristics of their constituent elements; including geometry, material, and their arrangement with respect to each other. A common approach to control properties of MSs is to employ lumped network elements such as capacitors, inductors, or resistors.

In some embodiments, once such MSs are designed they cannot change their functionalities and electromagnetic properties and they have fixed reflection and transmission characteristics. When the elements are controllable, the resultant metasurface would be adjustable. This smart metasurface can have two or more different modes of operation by changing the external conditions. The choice of appropriate external control mechanism is mostly determined by the operation frequency range.

There are three common control methods for metasurfaces including physical change, material state change, and use of controllable circuit elements. The first two methods cover almost all the frequency spectrum from microwaves to optics, while the third one is only applicable at microwaves. The physical change of the structure of constitutive elements can be achieved either by mechanical manipulations or with microfluidics or microelectromechanical systems (MEMS). In the second method, slabs of materials with variable properties such as ferrites, semiconductors or phase-changing materials are usually employed as substrates for metal inclusions producing a tunable MS. In the third method which is common in the microwave frequencies, solid state diodes or switches are employed to realize controllable metasurfaces.

Radar Sensor and detection

Many vehicles, especially autonomous cars are equipped with pulse or Frequency-Modulated Continuous-Wave (FMCW) radars. These radars can be Short-Range Radar (SRR), Mid-Range Radar (MRR), and Long-Range Radar (LRR), with the maximum measurement range of up to approximately 30 meters (m), 150 m, and 250 m, respectively. The radar system is operable to generate the electromagnetic radar radiation in a frequency range of approximately 10 GHz to approximately 200 GHz. Optionally, the radar system can be an FMCW radar to generate the electromagnetic waves at a frequency range of approximately 76 GHz to approximately 81 GHz. Alternatively, the radar system can be an FMCW radar to generate the electromagnetic radar radiation at a frequency range of approximately 24 GHz to approximately 24.25 GHz. These radar sensors can be used for different applications in vehicles or trains.

Many objects around a simple radar sensor have low RCS and low reflections. They cannot be used for collision avoidance scenarios especially for simple radar sensors that do not have high range and angle resolutions. In some designs, radar reflectors are proposed and applied to effectively reflect incoming radar electromagnetic signals. They can be found in safety vests, road-side reflectors, and bicycles. An example of such reflectors are corner reflectors. These reflectors are used to generate a strong radar echo from objects. The incoming electromagnetic signals are backscattered by multiple reflections in the direction from which they come. Therefore, small objects with small RCS have a significant strong echo. and can be used for some early warning of accidents.

FIG. 1 illustrates an example of a smart metasurface reflector system 100, in accordance with some embodiments. The smart metasurface reflector 110 can have different shapes including, but not limited to, different corner reflectors and their combinations. The metasurfaces for different edges can have multiple states and can be controlled. The geometry shapes and states may be applied as different radar traffic signs. These radar traffic signs may work in tandem with radar sensors 120 for different applications including to signal traffic at road intersections, rail crossings, vehicles, and drones.

Figure 2:
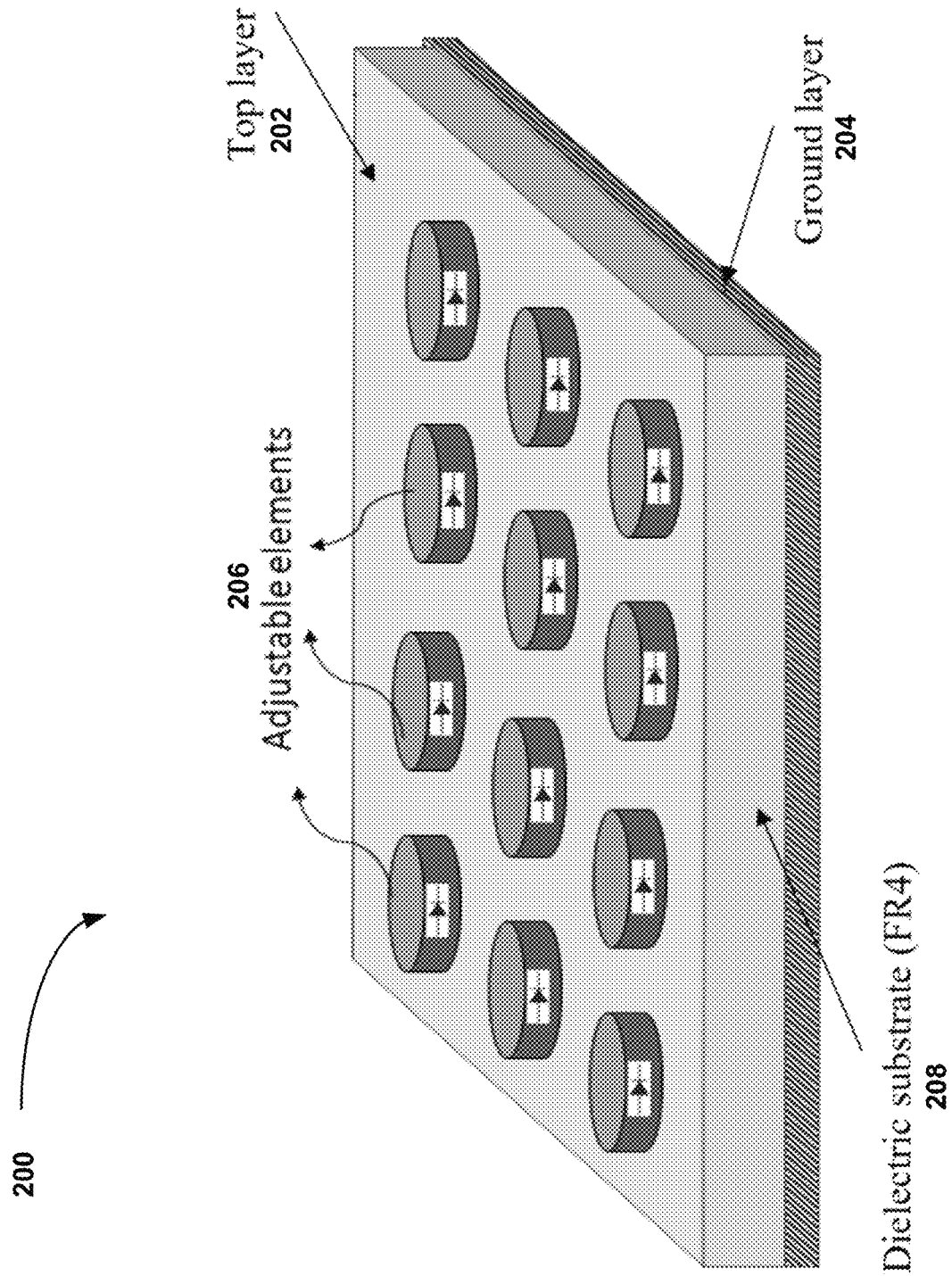
FIG. 2 illustrates an example of a metasurface (MS), in accordance with some embodiments.

As described herein, in some embodiments, the smart metasurface reflectors may be replaced with motorized corner reflectors with inner walls made of electric conductor material, or non-conductor material plated with electric conductor material. Metasurface and mmWave Radar FIG. 2 illustrates an example of a metasurface (MS) 200, in accordance with some embodiments. The MS 200 may comprise at least two layers of printed circuit board (PCB) board 202, 204. The second layer 204 is grounded, and elements 206 are part of the top (or first) layer 202. In some embodiments, a dielectric substrate 208 (e.g., FR4) may be present between the elements 206 and the ground 204. The specification of elements 206 are preferably controlled in an adjustable metasurface. This can be done by using biasing means (e.g., diodes or switches) which connect or disconnect different parts of the elements 206 of the metasurface. One or more biasing means may be located on the first (or top) layer or an additional layer below the second (or ground) layer. The biasing circuits of switches are in the first (or top) layer or additional layer(s) below the second (or ground) layer. The biasing circuits and diodes or switches may be connected to the top (or first) layer through at least two metal pins or vias. By controlling the bias voltage, the states of the elements 206 are changed and the operation mode of the metasurface is switched. The metasurface biasing circuit may be controlled by a Field-Programmable Gate Array (FPGA), Digital Signal Processing (DSP), Complex Programmable Logic Device (CPLD), or microcontroller.

Figure 3B:
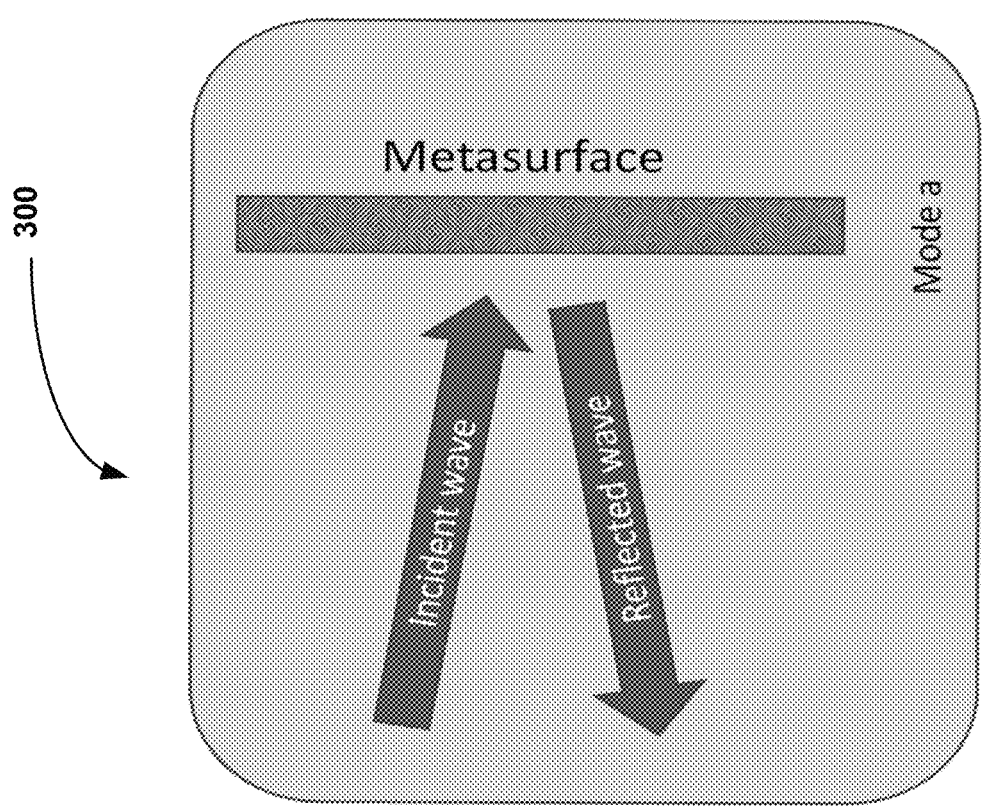
FIGS. 3A and 3B illustrate examples of MS modes of operation, in accordance with some embodiments.
Figure 3A:
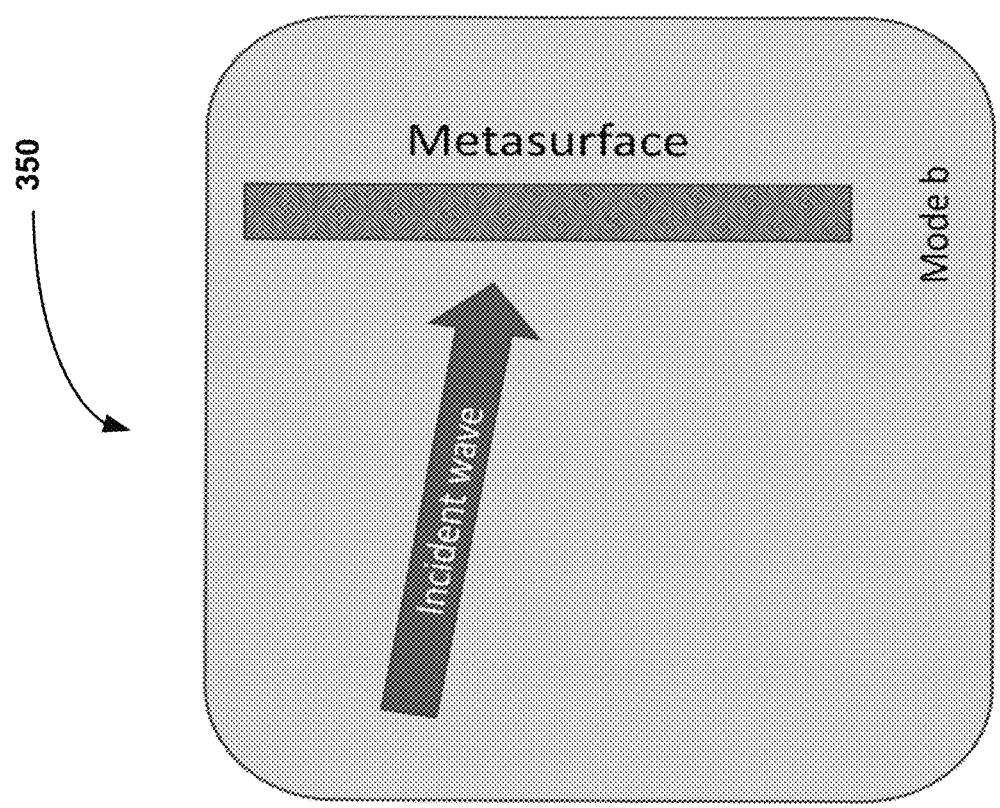

A smart metasurface provides different functionalities in different modes for the user. In one embodiment, a smart reflective metasurface may have different RCSs in different modes, so that the radar sensor can distinguish between modes by detecting different RCSs. For example, a metasurface can work in two modes of operation, reflection or absorption. FIGS. 3A and 3B illustrate examples of MS modes of operation 300, 350, in accordance with some embodiments. In reflection mode 300 (shown as "Mode a" and may be optionally named or labelled as an "ON" state)

the metasurface acts as a full reflector, like a perfect electric conductor plane. On the other hand, in absorption mode 350 (shown as "Mode b" and may be optionally named or labelled as an "OFF" state) the MS absorbs the incident wave, and no wave is reflected. Therefore, in this example, there are two different RCSs in two modes ("Mode a"/"ON" and "Mode b"/"OFF"), which can be recognized by the radar sensor as a sign.

Figure 4A:
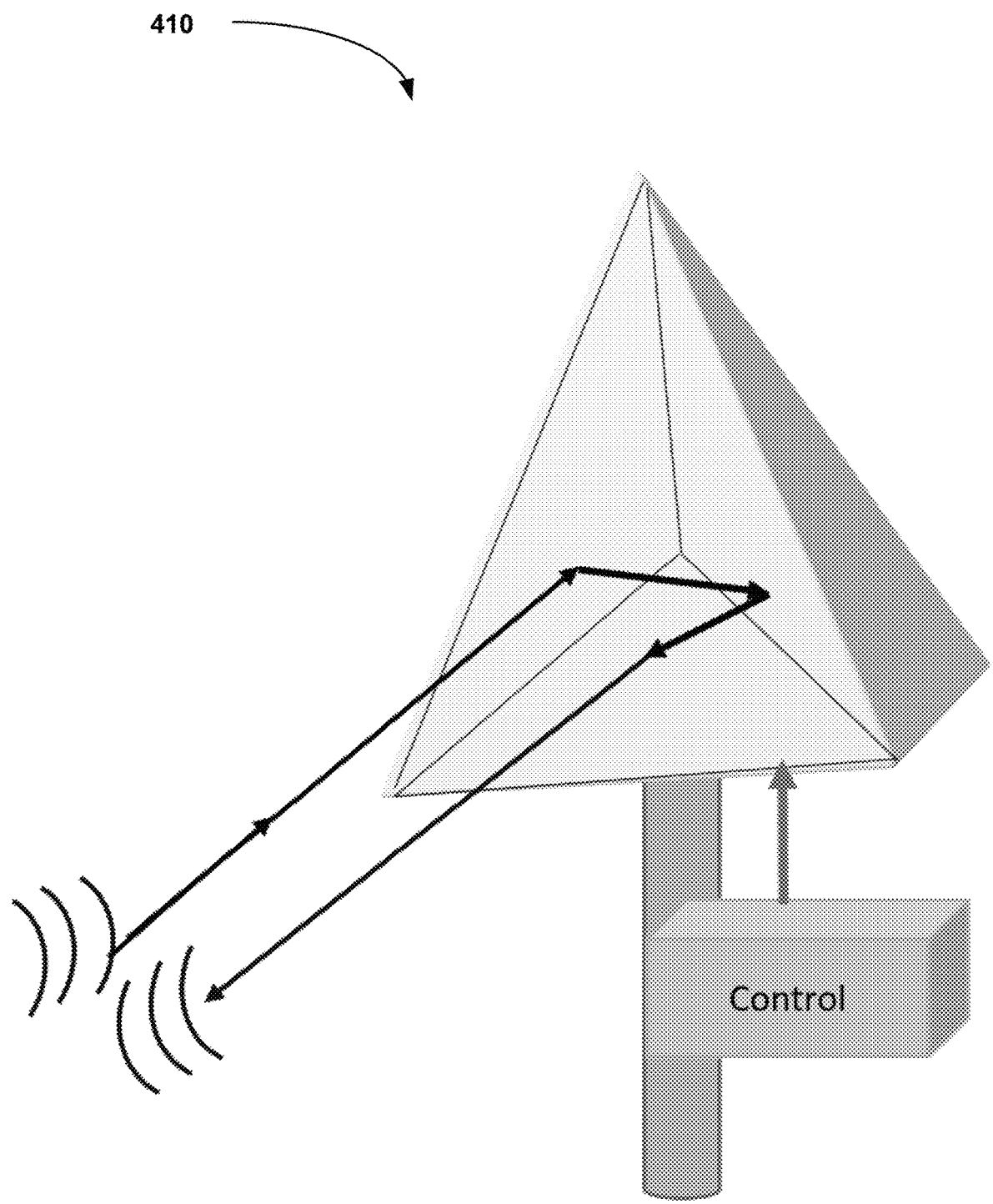
FIGS. 4A to 4D illustrate examples of corner reflectors, in accordance with some embodiments.
Figure 4B:
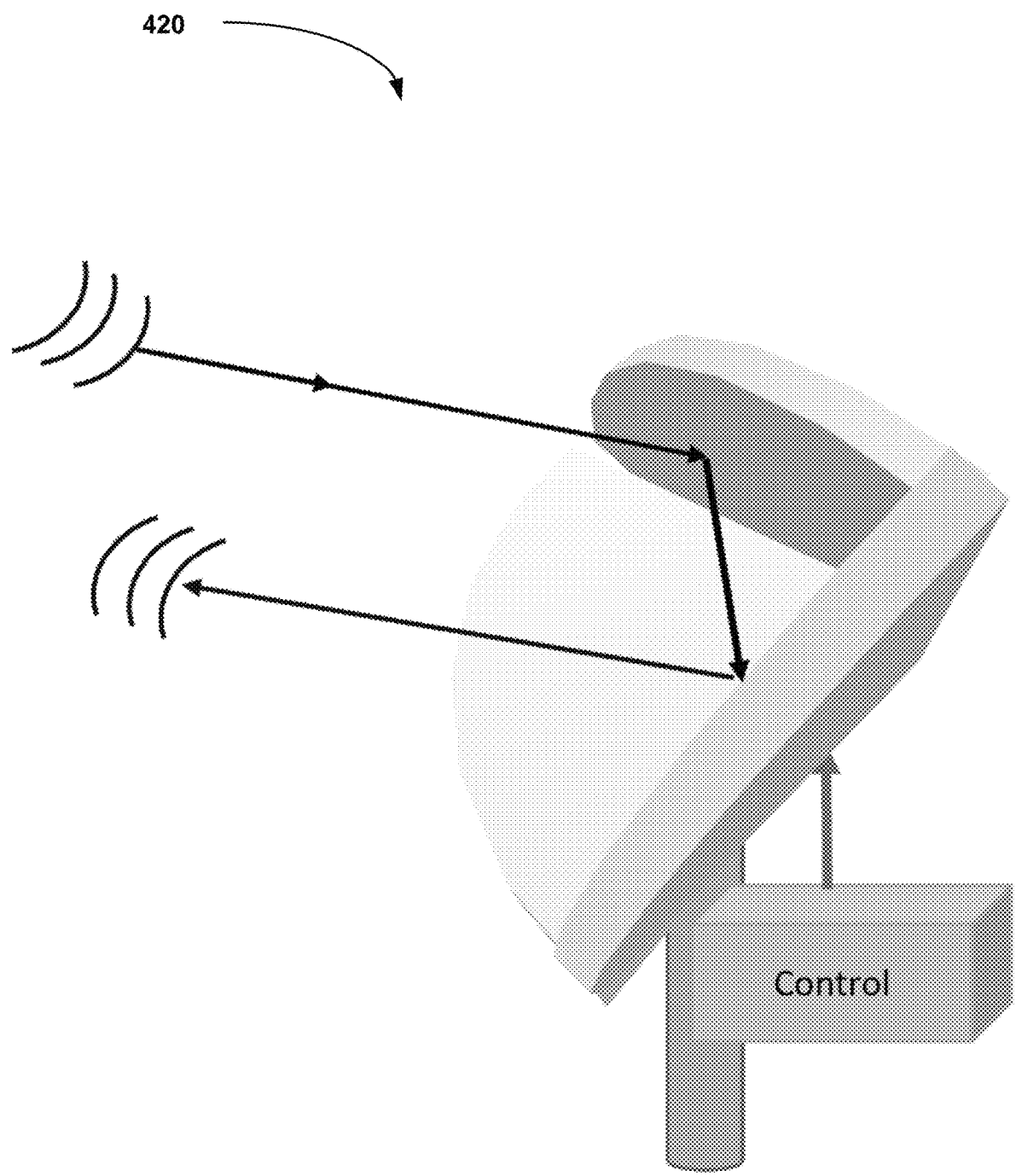
Figure 4C:
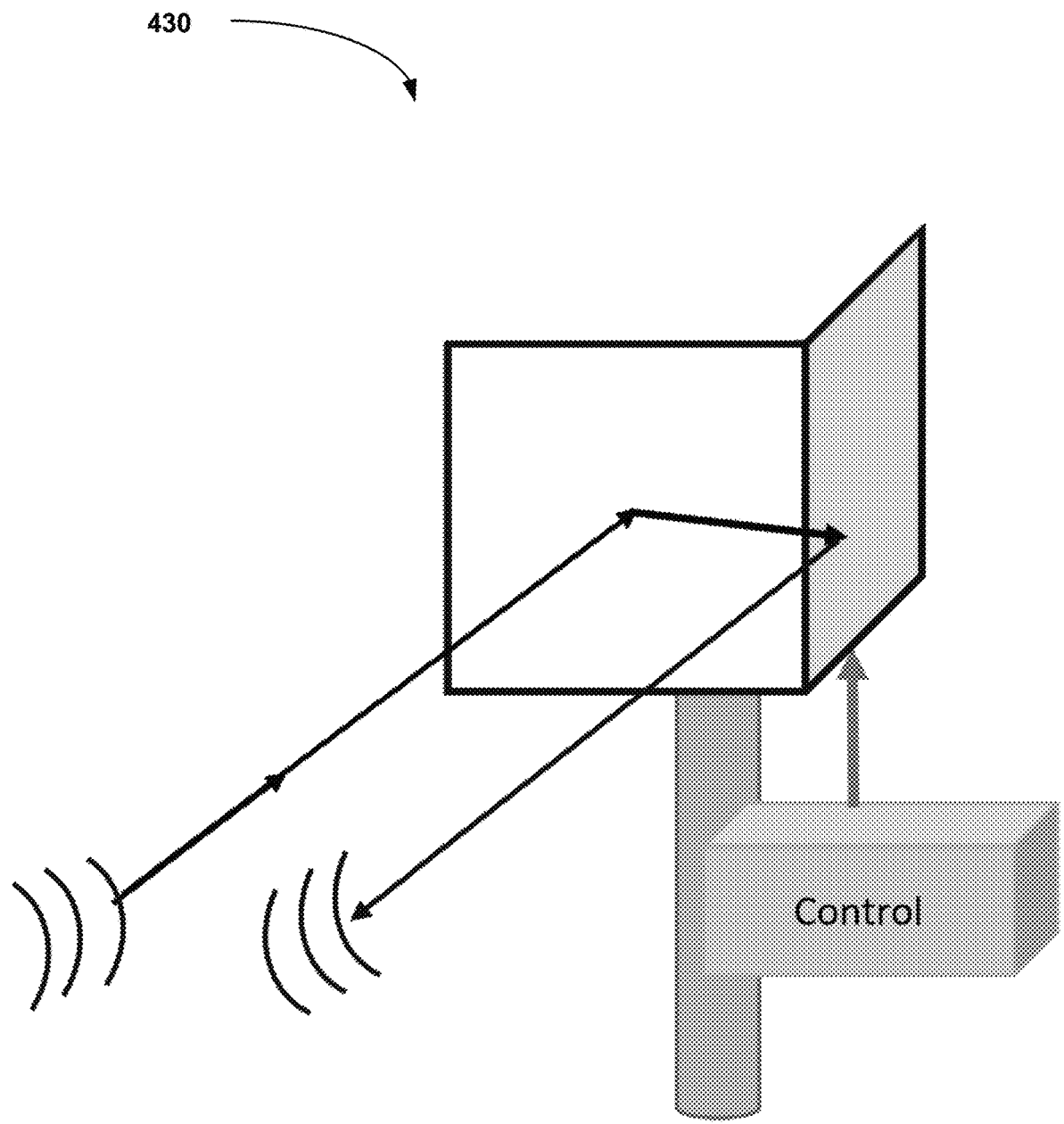
Figure 4D:
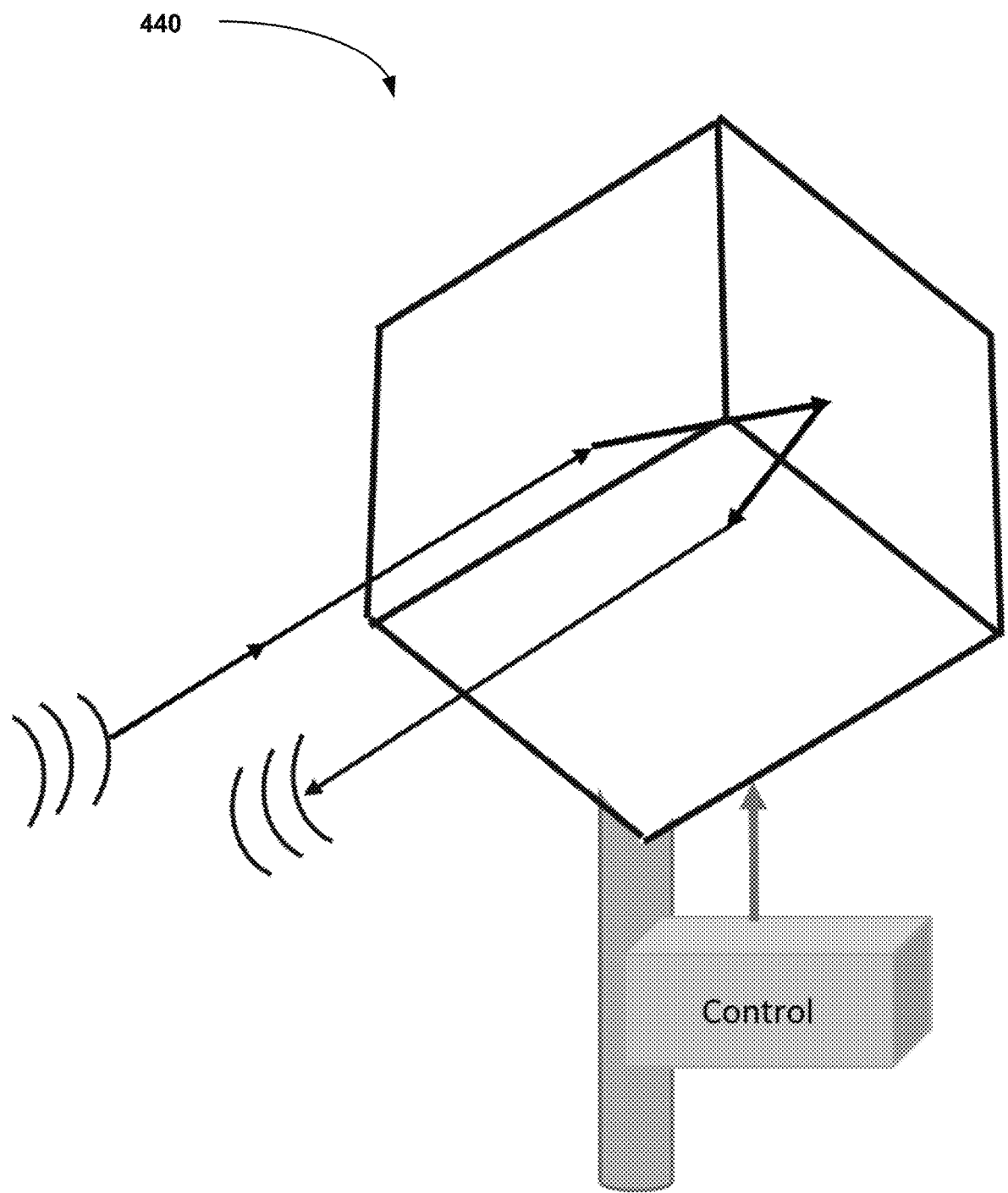

In another embodiment, the ON and OFF states of the metasurface can be changed based on a pattern including but not limited to periodically change in time. Therefore, the radar sensor will detect a target with periodic RCS function as a radar sign. In another embodiment, three smart metasurfaces may be combined into a one corner reflector, and therefore comprise a smart meta-corner reflector design. FIGS. 4A to 4D illustrate examples of corner reflectors having high RCS, in accordance with some embodiments. FIG. 4A illustrates an example of a triangular trihedral corner reflector 410, FIG. 4B illustrates an example of a circular trihedral corner reflector 420, FIG. 4C illustrates an example of a dihedral corner reflector 430, and FIG. 4D illustrates an example of a square trihedral corner reflector 440. Other configurations and shapes of corner reflectors may be designed. The configurations and shapes of different corner reflectors can be optimized to have proper RCS in different angles and shapes.

Each internal plane of these corner reflectors may be made of the proposed metasurface 200 and can work in different modes, especially as a perfect reflector 300 or as an absorber 350. These smart meta-corner reflectors, named electronic Radar Traffic Signs (RTSs), may be designed, and optimised with proper RCS which should be large enough to be detected by different radars and in different scenarios in any intersection. These radar traffic signs can be designed and developed with different control states, configurations, and geometries, and applied as radar stop signs, radar turn left or right signs, accident early-warning signs, or other traffic signaling signs.

In another embodiment, the inner walls of a corner reflector can be made of a good electric conductor instead of metasurface, such as metal alloy, aluminum, or copper, and may be included a gold, silver, or other type of good electric conductor plating/finishing. The corner reflector can be made by a plastic, 3D printer material or other material (including non-3D printer material), and its inner wall may be a gold, silver, or other type of good electric conductor plating/finishing. This corner reflector can be motorized. It can be rotated with different Revolutions per Minutes (RPM), or its direction can be controlled with a specific pattern by any kind of motor such as a stepper motor. The front side of a corner reflector can be covered by a motorized mechanism to block the incident wave into corner reflector. This smart motorized corner reflector can be used instead of the smart meta-corner reflector as a radar traffic sign. When the incident wave is blocked, the corner reflector state is OFF, and no considerable electromagnetic wave is reflected to the radar. In contrary, when the corner reflector is aligned to the radar, its state is ON and the radar on a vehicle can detect it clearly. Like the smart metasurface corner reflector, the ON and OFF states of this smart motorized corner reflector can be controlled and the radar can detect the stop state or accident early-warning signal from the reflected received signals. This mechanical radar traffic sign can work in all frequency ranges, and is controlled mechanically. On the other hand, the radar traffic signs may be built with smart meta-corner reflectors controlled electronically, and may be design for specific or multiple frequency bands.

The electronic radar traffic signs can be designed in different frequency ranges including the Industrial, Scientific, and Medical (ISM) frequency bands such as approximately 24 GHz to approximately 24.25 GHZ, and Millimeter Wave (mmWave) bands such as approximately 75 GHz to approximately 85 GHZ. Three special bands in which vehicle commercial radars are available are 24 GHZ to 24.25 GHZ, 76 GHz to 77 GHz for long range radars, and 77 GHz to 81 GHz for short range radars. The mmWave bands 76 GHz to 81 GHz have the benefit of high allowed equivalent isotropic radiated power (EIRP) up to 55 decibels per milliwatt (dBm), as required by the European regulations and enable long range radar applications. The electronic radar traffic sign comprises a controllable metasurface reflector. Inside of the reflector is comprised of at least a controllable metasurface. The Radio Frequency (RF) wave is transmitted to the radar traffic sign and reflected to the radar sensor. In some embodiments, the current design is for FMCW radars with frequency range of approximately 24 GHz to approximately 24.25 GHZ, or approximately 76 GHz to approximately 81 GHz. However, an FMCW radar can be extended to other frequencies and radar sensors. An FMCW radar transmits a continuous frequency signal, named a chirp, for a specific time and repeats this signaling continuously. Multiple chirps create a frame. The timing between chirps is accurate and controlled by a hardware; however, the timing between frames is controlled through a software and may not be accurate. The received signal is mixed with transmitted signal and creates an Intermediate Frequency (IF) signal which can be sampled with an Analog to Digital Converter (ADC). The radar signal can have at least one transmitter and one receiver.

Figure 5:
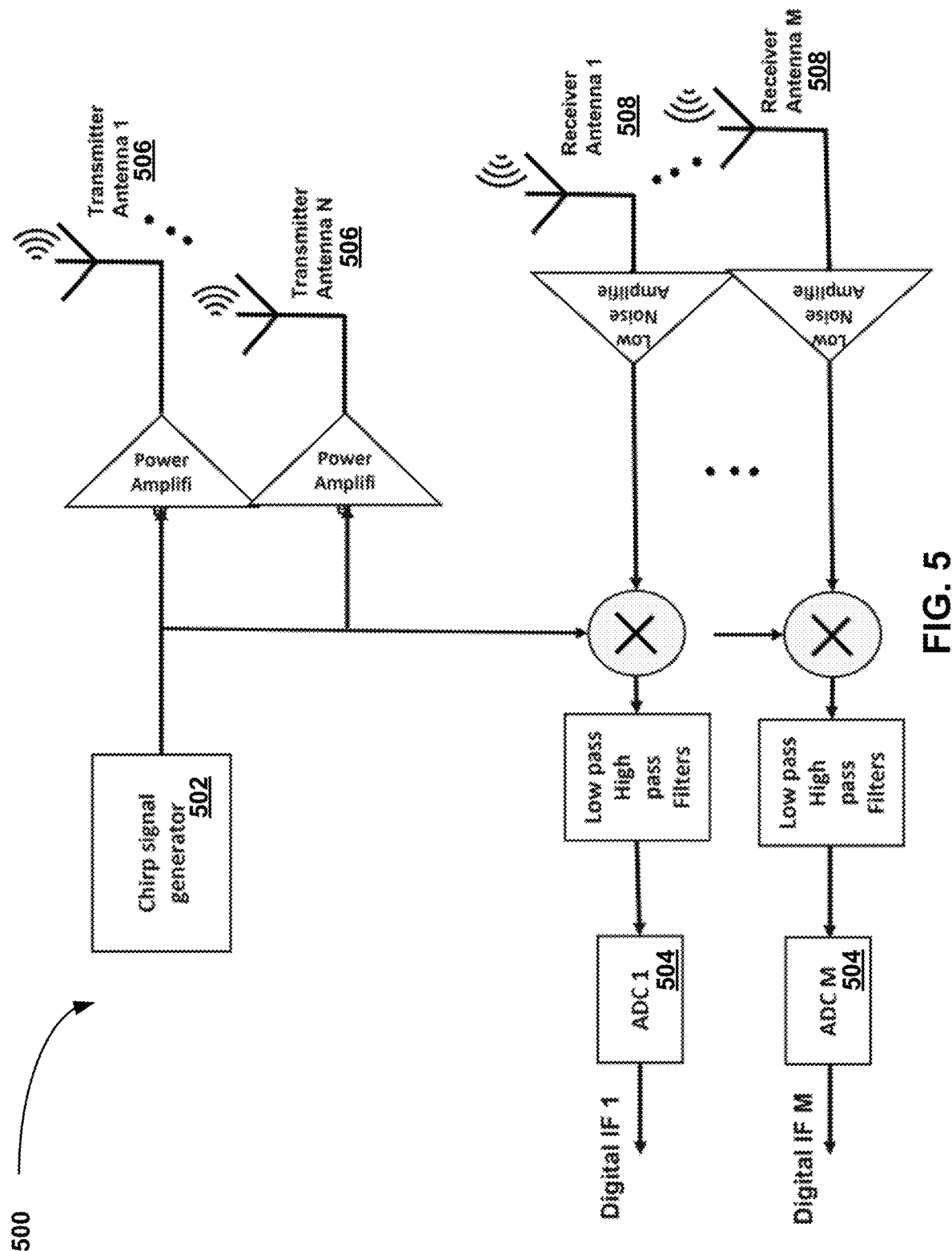
FIG. 5 illustrates, in a block diagram, an example of an FMCW radar sensor, in accordance with some embodiments.

FIG. 5 illustrates, in a block diagram, an example of an FMCW radar sensor 500 with N transmitters 506 and M receivers 508 (where N and M are positive integers), in accordance with some embodiments. The chirp signal generator 502 generates a signal which may sweep a frequency band in a specific time window for example from a low frequency to a high frequency named up-chirp signal, a high frequency to a low frequency named down-chirp signal, or a low frequency to a high frequency and return to a low frequency named up-down-chirp signal. The transmitted signal shines on some objects and is reflected to the radar. The received signal is mixed with a copy of its transmitter signal and an IF signal is sampled in the ADC blocks 504.

Figure 6:
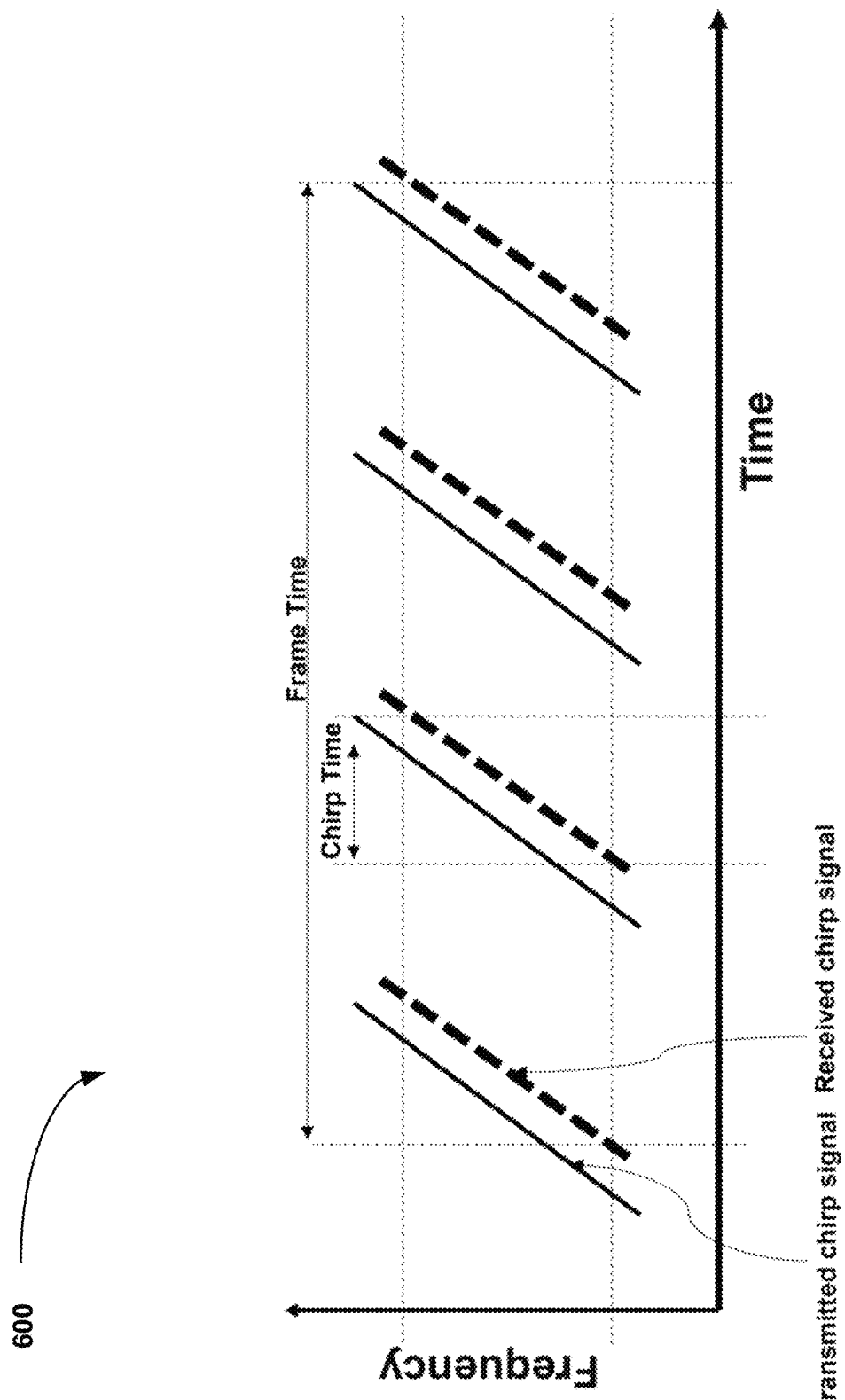
FIG. 6 illustrates, in a plot diagram, an example of a frame of four transmitted and received chirps in an FMCW radar, in accordance with some embodiments.

FIG. 6 illustrates, in a plot diagram, an example of a frame of four transmitted and received chirps in an FMCW radar 600, in accordance with some embodiments. FIG. 6 shows a transmitted frame and its corresponding received frequency-time frame. There are four up-chirp signals in the frame. The transmitted and received signals are mixed and filtered. These mixed signals are equal to some IF low bandwidth signals. These IF signals are sampled by ADC blocks and used for signal processing and detection.

In some embodiments, the IF signal should be in the range of high pass and low pass filter responses and ADC frequency sampling to detect an object in a certain distance. Moreover, the radar sensor should have enough transmitting power and gain that its receiver and processing parts can detect an object in front of the sensor with low false alarm. Two specific exemplary applications are described herein to test the performance of radar traffic signs: road intersections and road/railway crossings. However, it should be noted that the current design is not limited to these exemplary implementations.

Figure 7A:
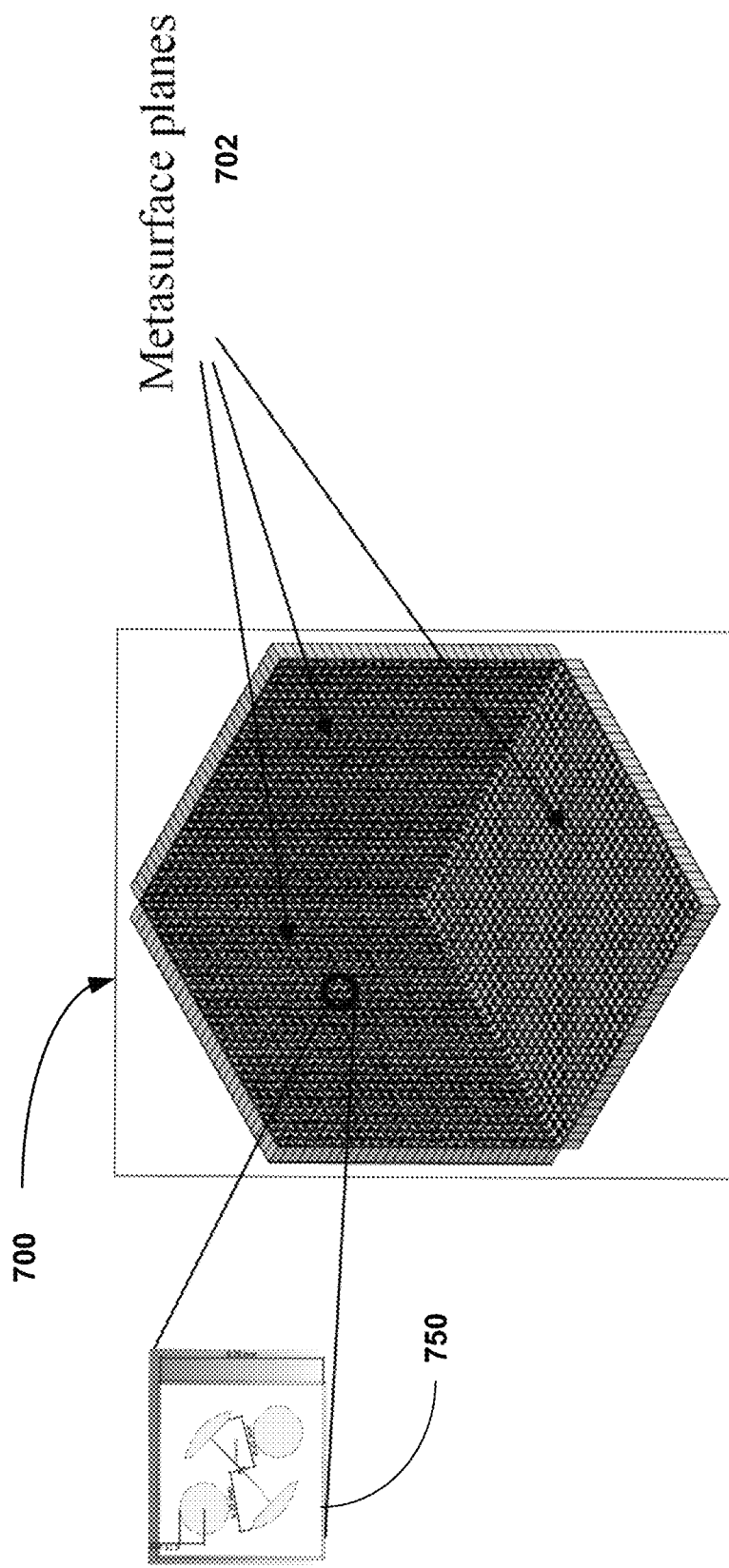
FIG. 7A illustrates a simulation example of an electronic square trihedral corner reflector, in accordance with some embodiments.
Figure 7B:
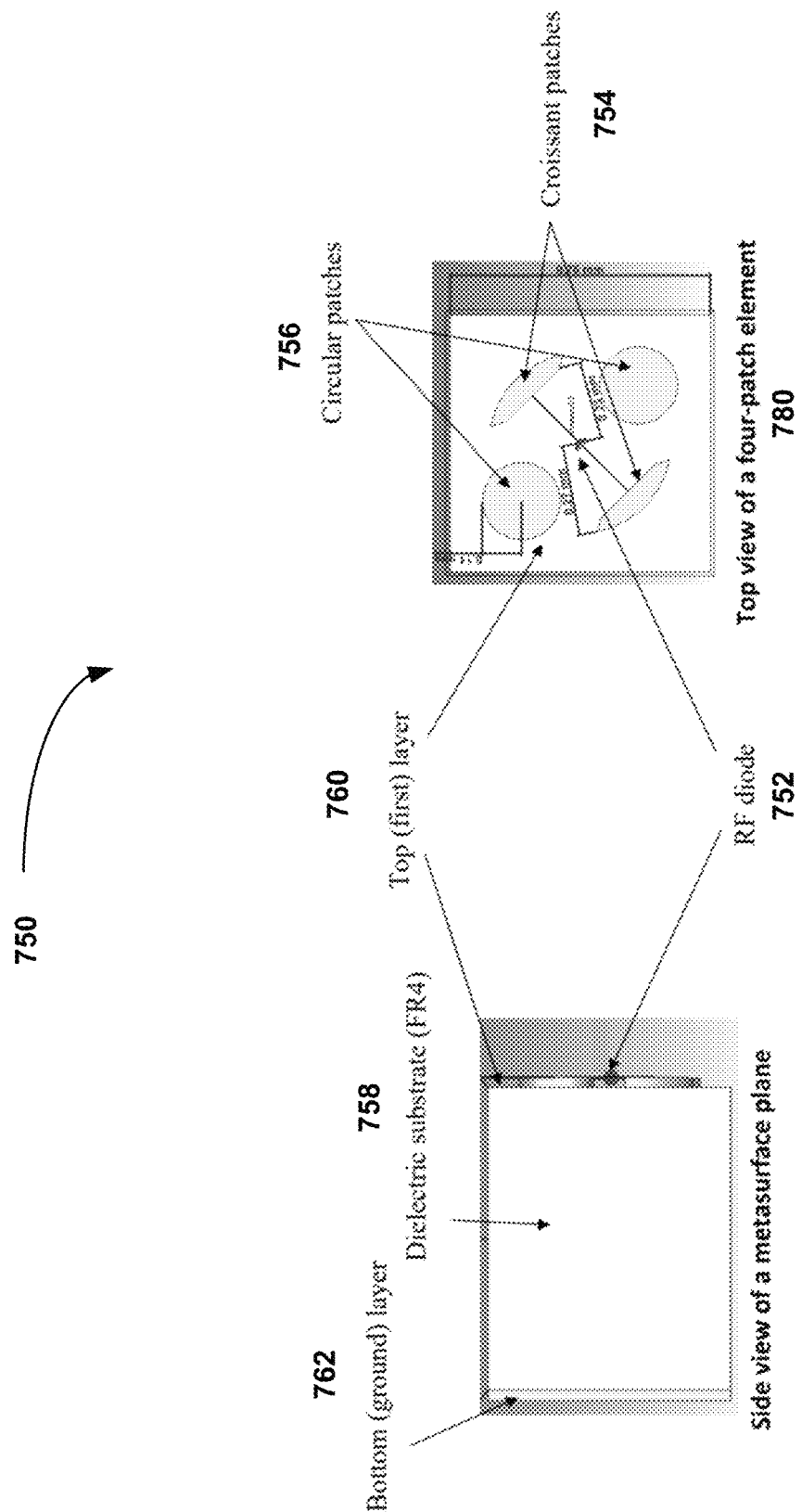
FIG. 7B illustrates a side view of a metasurface plane and a top view of a four-patch element, in accordance with some embodiments.

FIG. 7A illustrates a simulation example of an electronic square trihedral corner reflector 700, in accordance with some embodiments. The electronic square trihedral corner reflector 700 has three square metasurface orthogonal planes 702. In some embodiments, each metasurface plane 702 may be built of 30 by 30 four-patch elements 750 arranged beside each other as shown in FIG. 7A. FIG. 7B illustrates a top view 780 of an example of an element 750, in accordance with some embodiments. In some embodiments, an element 750 has two croissant patches 754, and two circular patches 756. A pin diode 752 (e.g., a MA4AGBLP912 pin diode) may be attached through two of these patches and its state is changed in forward bias (ON mode) and reverse bias (OFF mode). In simulation, the RF model of each mode for pin diode is implemented. Each metasurface plane has a dielectric substrate 758 (e.g., FR4) and a ground layer 762 (or bottom layer) below the substrate 758 and top layer 760. In some embodiments, the dimension of each four-patch element may be 0.76 millimeters (mm) by 0.76 mm so that the dimension of each metasurface plane may be 22.8 mm by 22.8 mm.

Figure 8A:
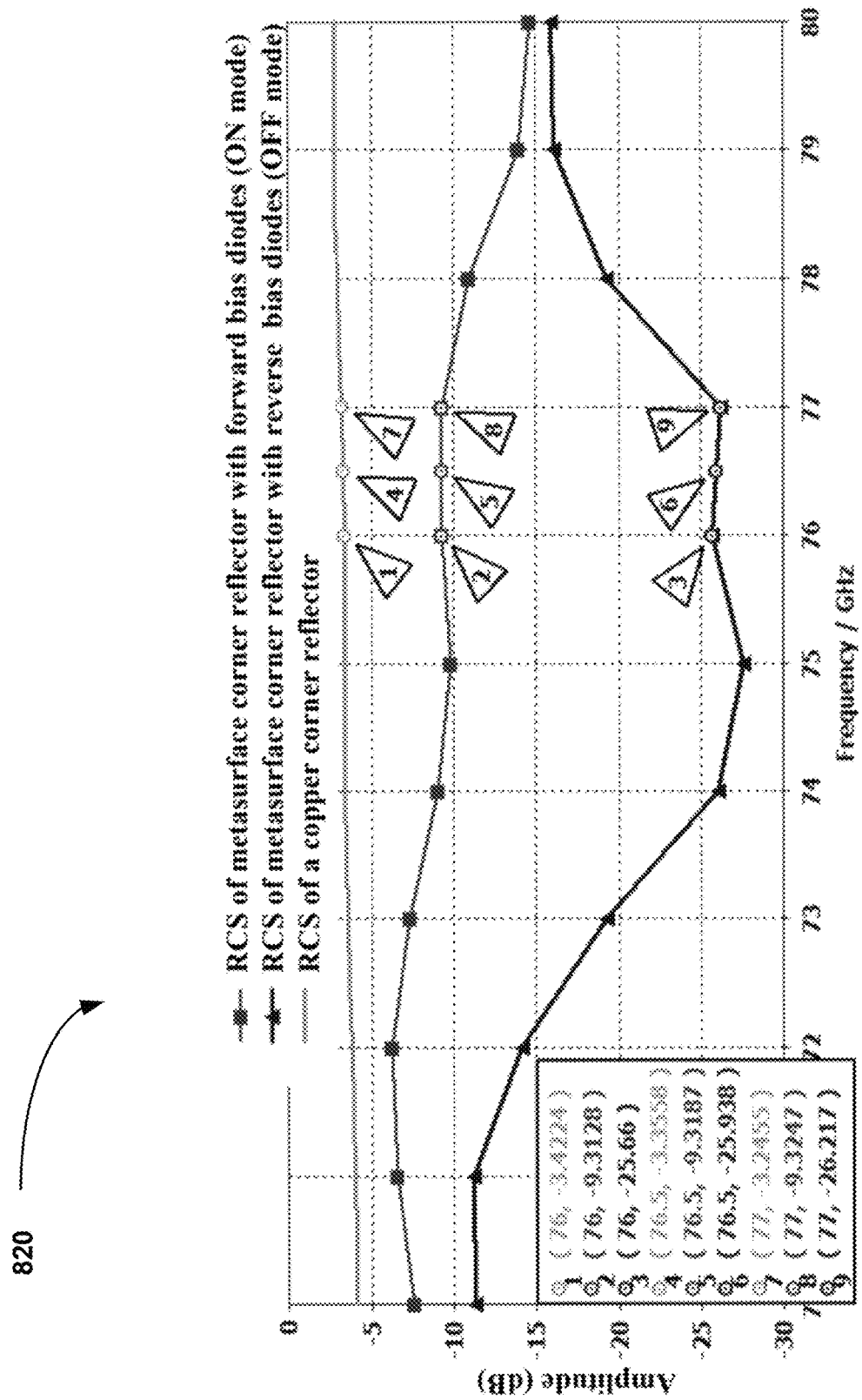
FIG. 8A illustrates an example of the RCS simulations of the metasurface corner reflector in FIG. 7A for two bias modes and frequency range 70 GHz to 80 GHz, in accordance with some embodiments.
Figure 8B:
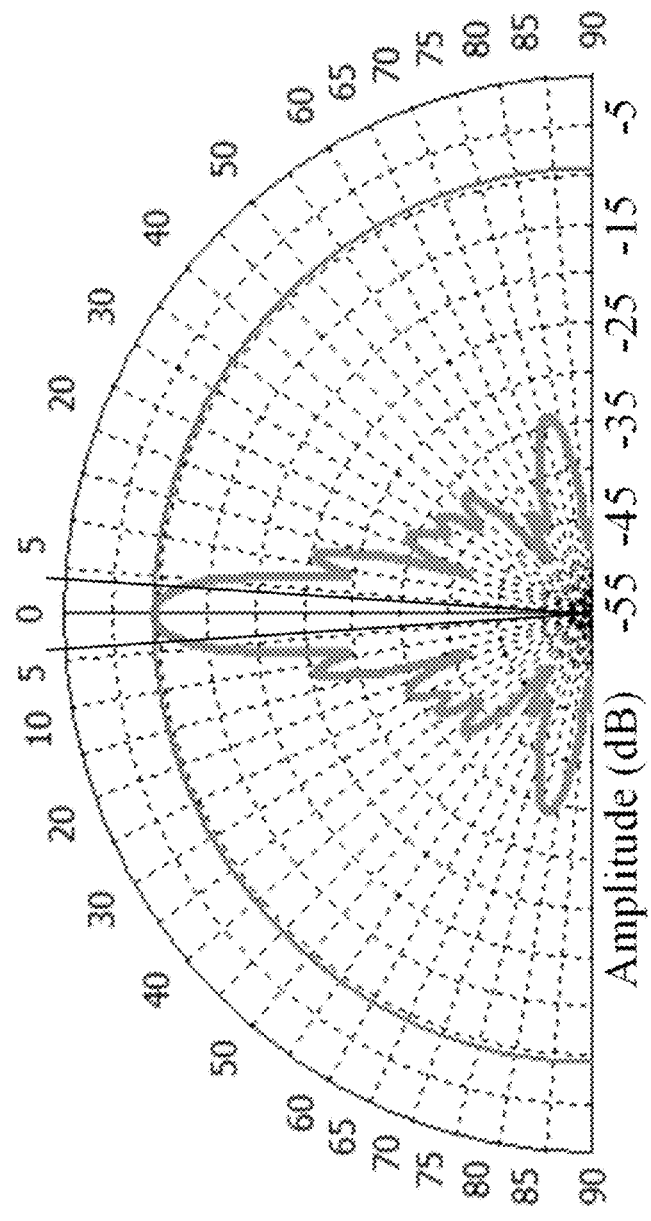
FIGS. 8B and 8C illustrate examples of the E-plane of RCS amplitudes of the metasurface corner reflector in FIG. 7A for two bias modes, frequency 76 GHz, $\varphi=0$ and $-90° \leq \theta < 90°$, in accordance with some embodiments.
Figure 8C:
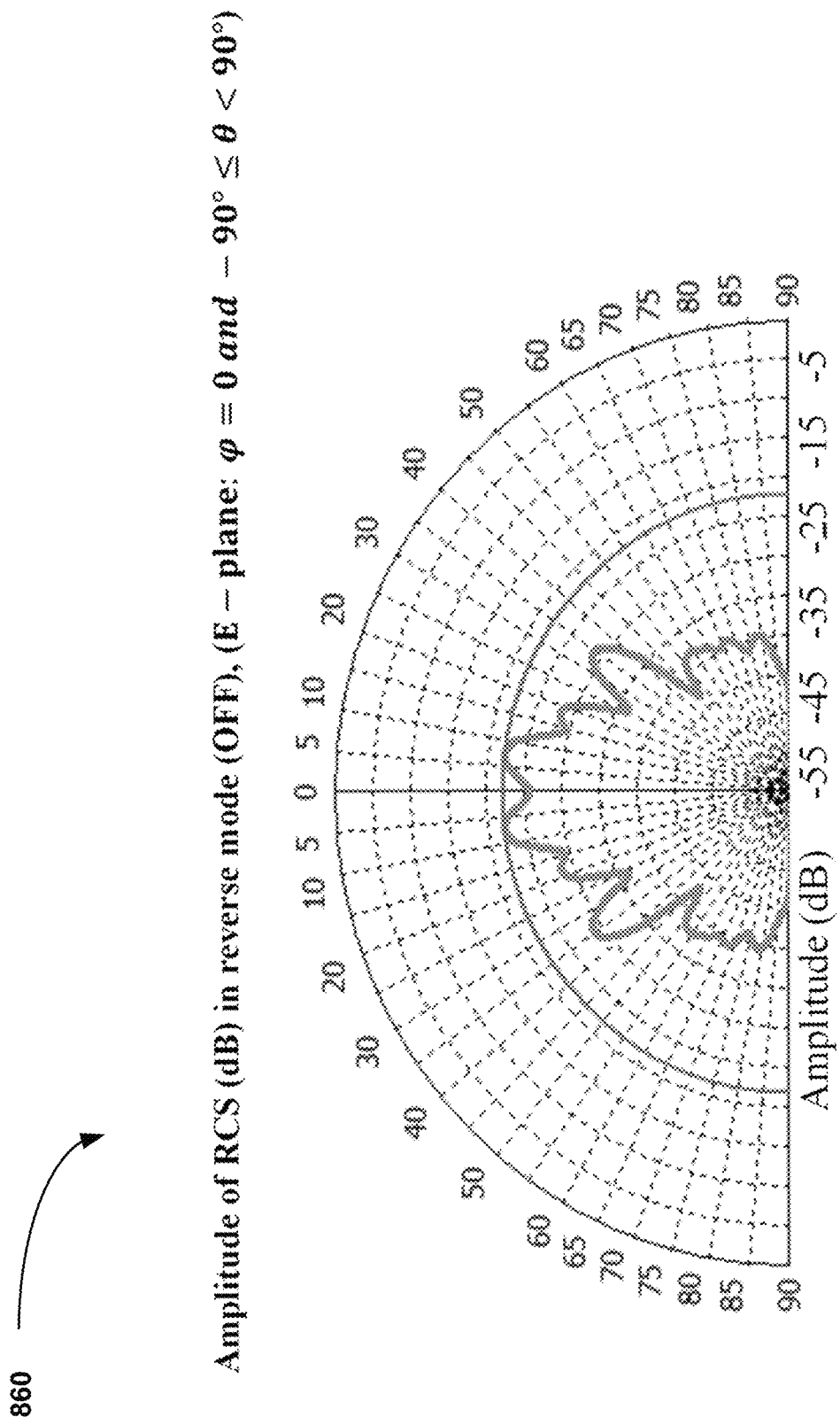

FIG. 8A illustrates an example of the RCS simulations of the metasurface corner reflector 700 for two bias modes comparing with the RCS of a square trihedral corner reflector made of copper as a reference 820, in accordance with some embodiments. The RCS values may be measured when the sensor and corner reflector are in front of each other and the lower metasurface plane of the corner reflector has angle of approximately 35.26° with ground. The RCS amplitude values for the metasurface corner reflector in two modes may have difference more than approximately 10 dB to be used as a radar sign in practice. The RCS simulations show approximately 15 dB difference in their amplitudes for frequency range 74 to 77 GHz at angle $\varphi=0$ and $\theta=0$. FIGS. 8B and 8C illustrate examples of the RCS amplitudes 840, 860 of the metasurface corner reflector 700 in frequency 76 GHz for E-plane, $\varphi=0$ and $-90°\leq\theta<90°$, in accordance with some embodiments. The RCS in forward mode has 3 dB half-power bandwidth of approximately 7°. The RCS patterns for two modes have at least 10 dB difference in different angles.

Figure 9A:
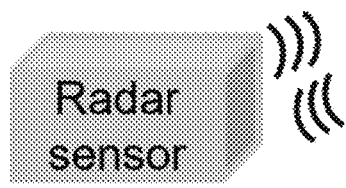
FIGS. 9A and 9B illustrate examples of two practical tests for an FMCW 24 GHZ radar and a mechanical square trihedral corner reflector, in accordance with some embodiments.
Figure 9B:
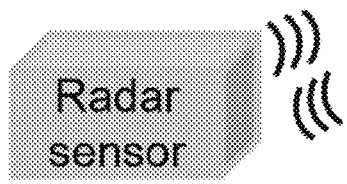
Figure 9C:
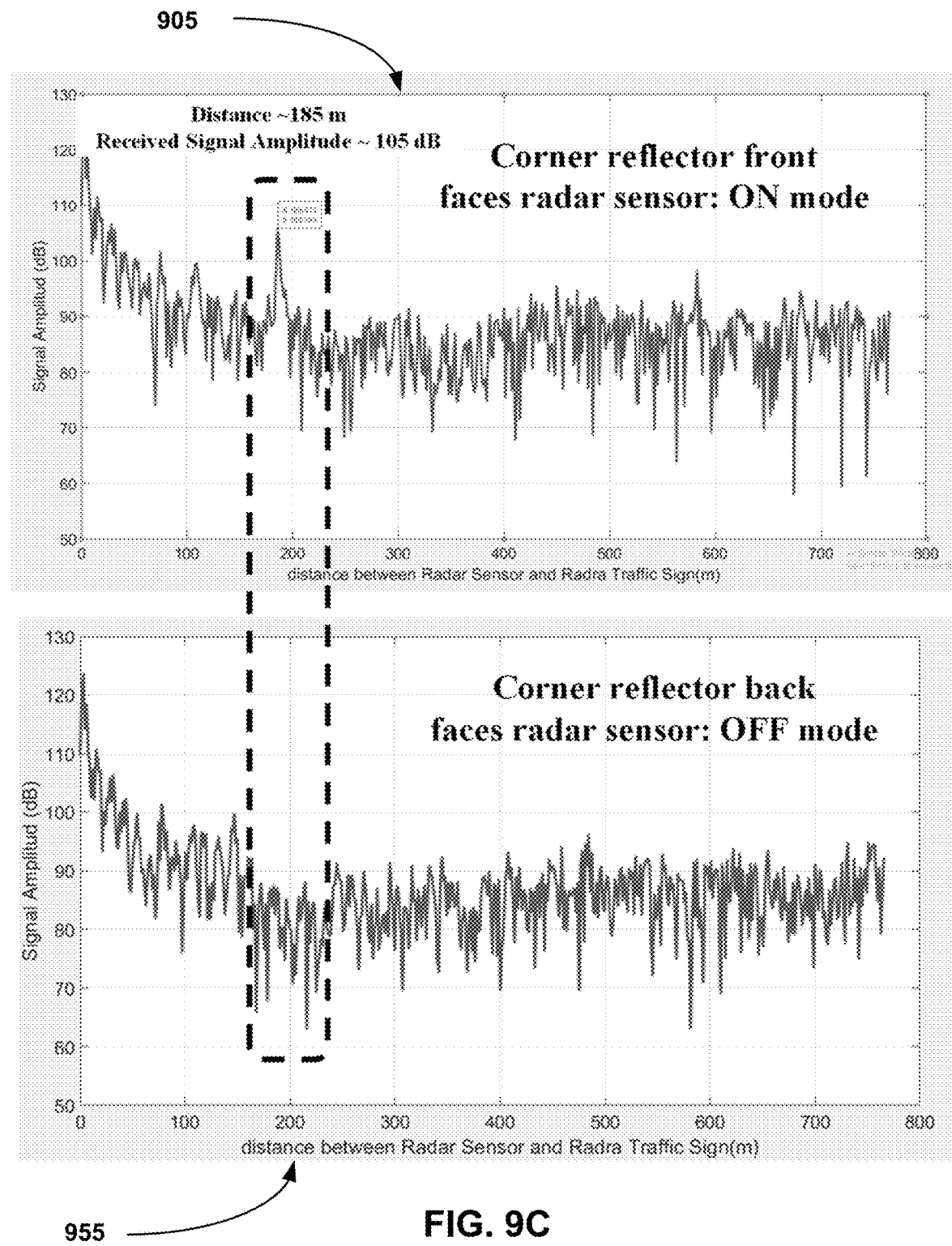
FIG. 9C illustrates two samples of the received IF signals in the radar sensor from corner reflector in FIGS. 9A and 9B and in distance approximately 185 m, in accordance with some embodiments.

FIGS. 9A and 9B illustrate examples of two practical tests for an FMCW 24 GHZ radar in the ON 900 and OFF 950 states, in accordance with some embodiments. The radar sensor has a chirp bandwidth 75 MHZ, one chirp per frame, and 100 frames per second. There is a mechanical square trihedral corner reflector used as a radar sign. Each copper plane of the corner reflector has approximately 20 cm by 20 cm dimension. The corner reflector is installed on a rotational stepper motor and rotates with frequency approximately 1 Hz. FIG. 9C illustrates two samples of the received IF signals in the radar sensor from above corner reflector in distance approximately 185 m in the ON 905 and OFF 955 states, in accordance with some embodiments. The radar sensor detects the corner reflector with high reflected signal power as a sign when it is facing it (ON mode). The lower plane of the corner reflector has an angle of approximately 35° with ground. However, the reflected signal power is dropped, and the radar sensor cannot detect the corner reflector when it is facing in any direction approximately more than 40 degrees away from the radar direction (OFF mode).

Radar Traffic Sign Applications

Figure 10:
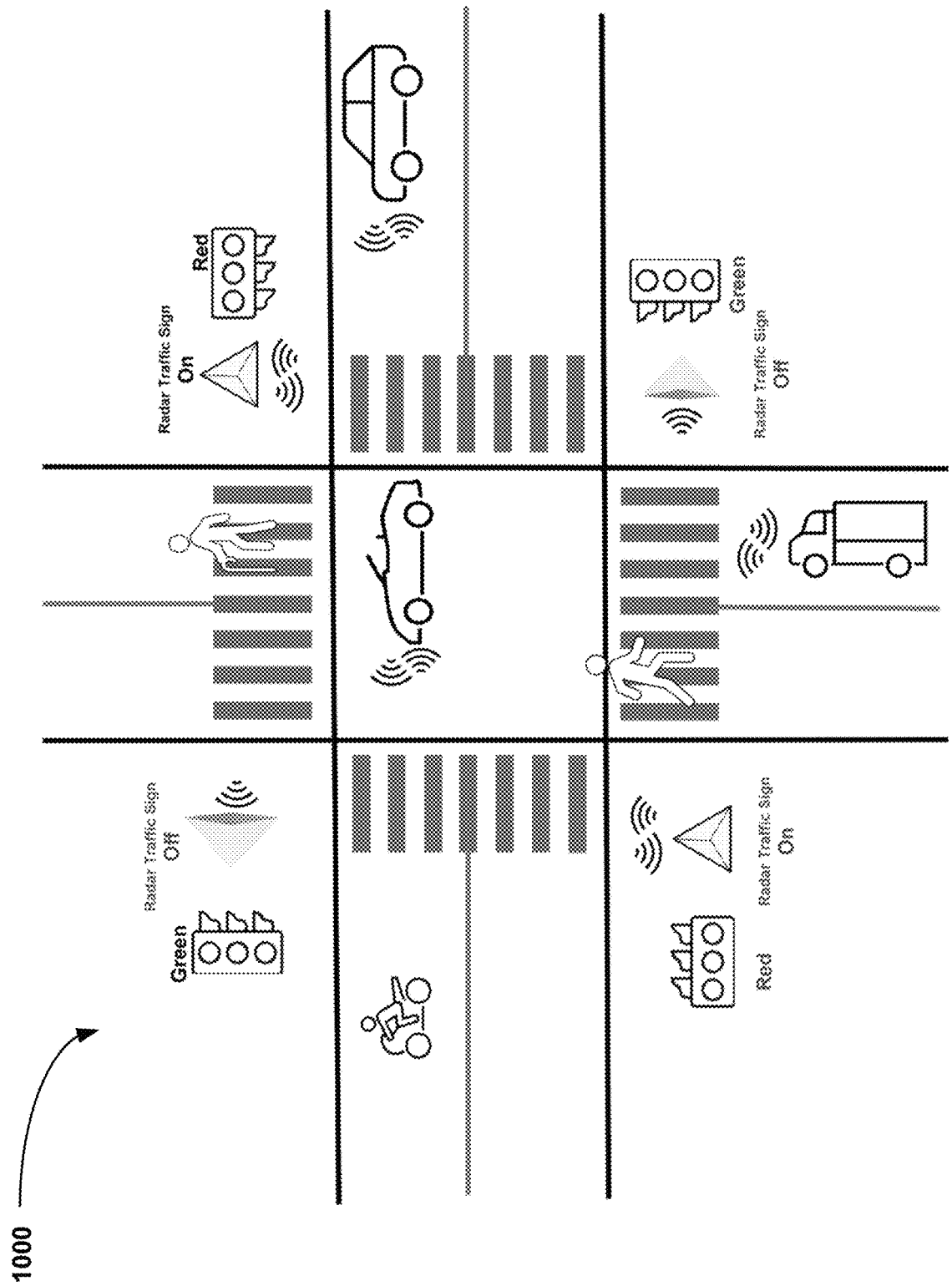
FIG. 10 illustrates an example of a radar traffic sign application, in accordance with some embodiments.

There may be different scenarios for radar traffic sign applications. FIG. 10 illustrates an example of a radar traffic sign road intersection application 1000, in accordance with some embodiments. Many future and autonomous vehicles have at least a radar sensor that scans its front side. When the radar traffic sign state is ON, it can reflect the received signal with a high RCS. The radar sensor can recognize the sign with its specific amplitude (for example, the vehicle can interpret it as a radar traffic red sign or stop sign). Furthermore, when the ON and OFF states of a radar traffic sign is changing with a specific rate for example approximately 1 Hz, the radar can recognize this frequency rate from the received signal and can interpret it as a flashing radar traffic stop sign. A flashing sign can be detected by radars that have high frame or pulse rate per second for example more than 10 Hz. These features are for simple radar sensors. More complex signs and features can be implemented by more complex radar traffic signs and radar sensors. In advanced radars that can process high image resolution, these smart corner reflectors, electronic and/or mechanical, can be combined for example with different geometries and shapes to form different radar traffic signs such as turn right, turn left, U-turn, or other traffic signs.

In some embodiments, the radar traffic stop sign is applicable especially for harsh weather such as heavy snow and rain, fog, and sun glare where the drivers and autonomous vehicles have very low optical visibility. For example, the radar traffic stop sign can inform the situation of the intersection to the driver to stop, or it is safe to cross the intersection.

Figure 11:
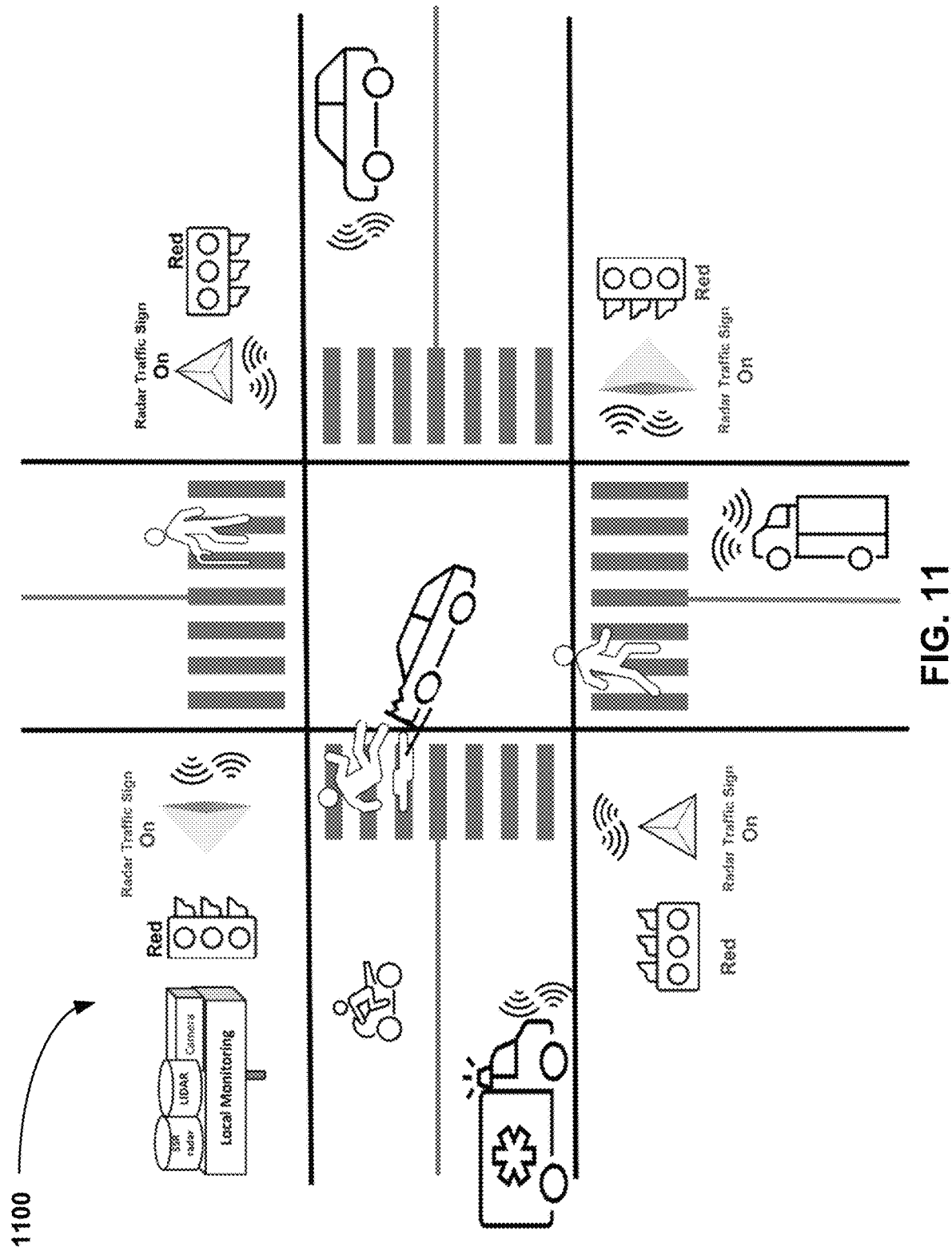
FIG. 11 illustrates a blocked intersection scenario handled by the radar traffic sign road intersection application, in accordance with some embodiments.

In some embodiments, the radar traffic sign can work as an early-warning system for accidents in road intersections. Most crossing objects from intersections do not have enough RCS that a radar sensor can detect them, especially from long distances. In this situation, the road intersection can be equipped with a monitoring platform including but not limited to camera, LIDAR, and sort-range radar sensors that continuously monitors the situation of a road intersection. FIG. 11 illustrates a blocked intersection scenario 1100 handled by the radar traffic sign road intersection application 1000, in accordance with some embodiments. As shown in FIG. 11, when the monitoring sensors in the intersection predict a hazardous situation, the radar traffic sign can be activated and work as a stop sign or flashing stop sign. Any remote vehicle that has a radar sensor and the radar traffic sign is in its field of view, can detect the radar traffic sign from a safe distance and the vehicle has enough time to stop and prevent any potential accidents. This situation is important in harsh weather where a driver has low visibility, and he or she has enough time to control the vehicle and stop it.

In some road intersections, radar traffic signs are not in the field of view of a vehicle radar. A real-time point-to-multipoint radio link can be installed between any approaching vehicle and the intersection as a vehicle-to-infrastructure (V2I) connection, and the situation of the intersection and any warning signal is monitored in real-time from a distance at least approximately 200 m. A vehicle monitors the live situation of the road intersection. If there is any accident or risky situation, the vehicle detects it through its radio link, and it has enough time to stop before any accident.

Figure 12:
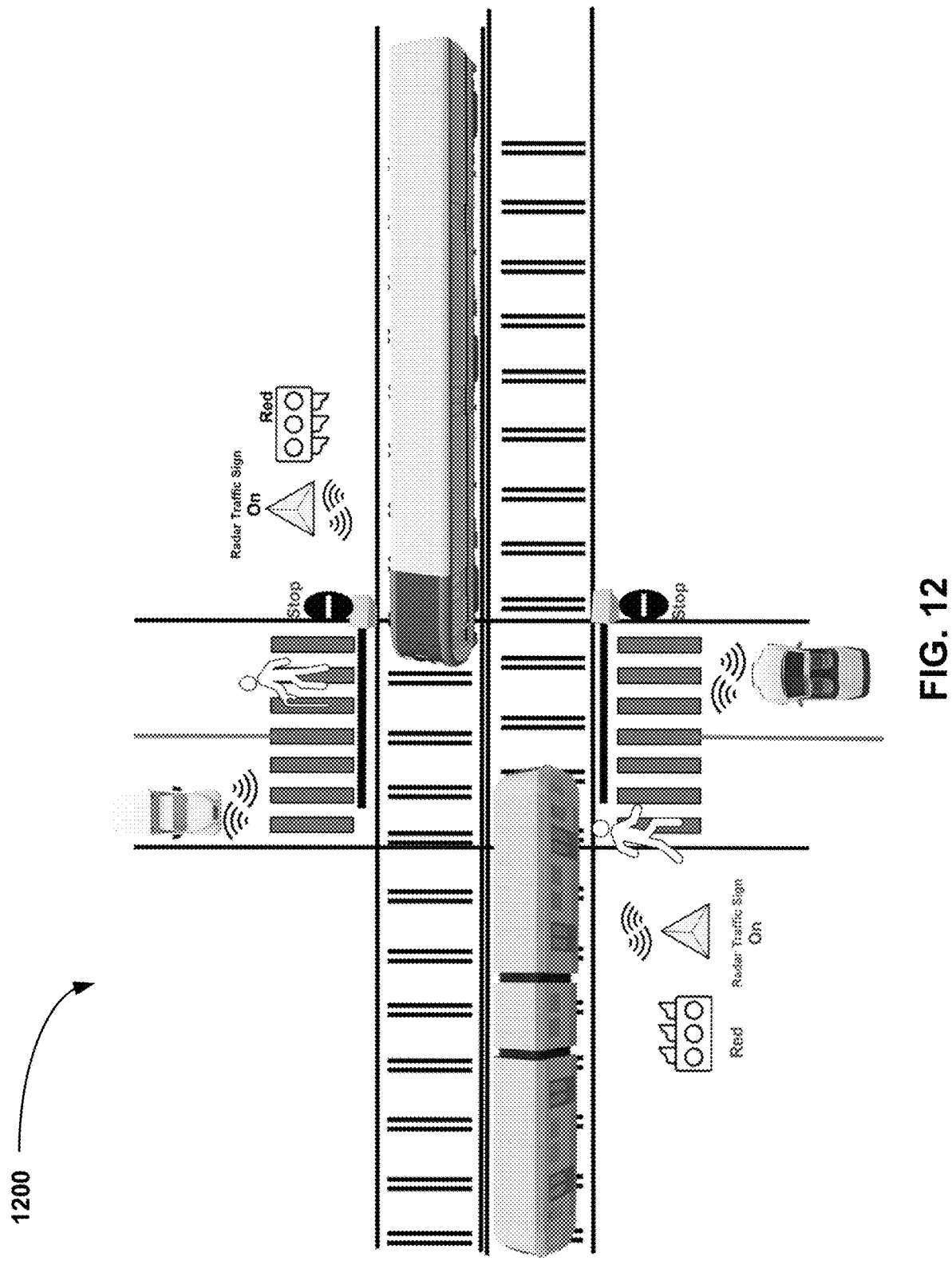
FIG. 12 illustrates an example of a radar traffic sign road/railway application, in accordance with some embodiments.
Figure 13:
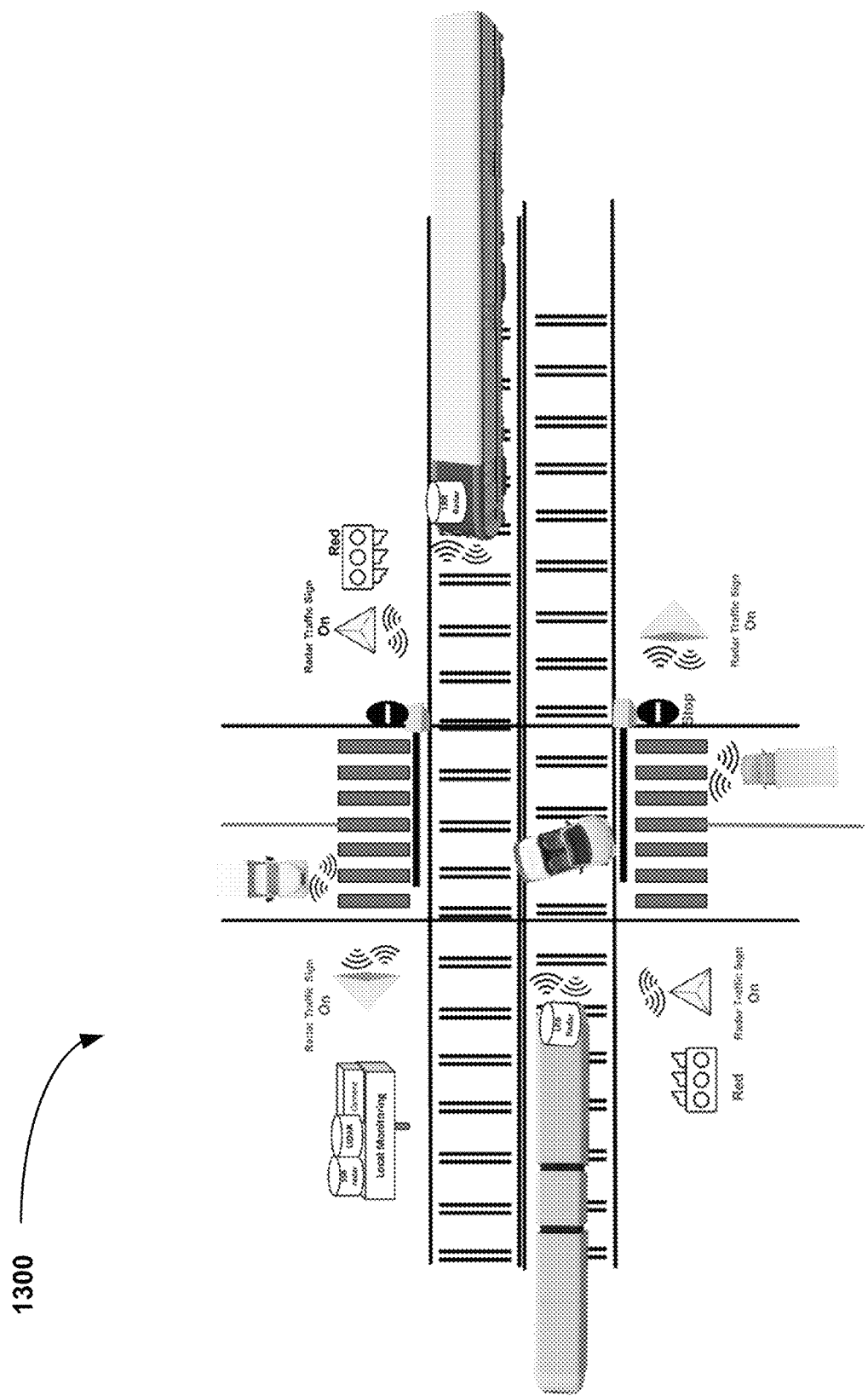
FIG. 13 illustrates a blocked road/railway crossing scenario handled by the radar traffic sign road intersection application, in accordance with some embodiments.

In some embodiments, radar traffic signs can also be used for railroad intersections. FIG. 12 illustrates an example of a radar traffic sign road/railway application 1200, in accordance with some embodiments. The application 1200 can be used as a stop sign and warn the vehicles to stop before railroad intersections. In some embodiments, an accident early-warning platform for train sides may be applied. For example, a monitoring platform including but not limited to a camera, LIDAR, or short-range radar sensors, can be installed in the railroad intersection and the train has a high gain radar that can detect radar traffic signs from a distance (e.g., at least approximately 1000 m or other suitable distance required for the train to come to a stop). If the monitoring system in the railroad intersection predicts any hazardous situation such as an accident on the rail, the radar traffic sign can be activated, and operate as a radar traffic stop sign or flashing stop sign. FIG. 13 illustrates a blocked road/railway crossing scenario 1300 handled by the radar traffic sign road intersection application 1200, in accordance with some embodiments. In some embodiments, the train radar can recognize this radar traffic sign from a safe distance, even in inclement weather.

In some railroad intersections, radar traffic signs are not in the field of view of train radar. A real-time point-to-multipoint radio link can be installed between any approaching train and the intersection as a V2I connection, and the situation of the intersection and any warning signal is monitored in real-time from a distance (e.g., at least approximately 1000 m, or any suitable distance that provides the train enough time to be able to come to a stop). A train monitors the live situation of the railroad intersection. If there is any accident or risky situation, the train can detect it through its radio link, and it has enough time to stop before any accident.

Figure 14:
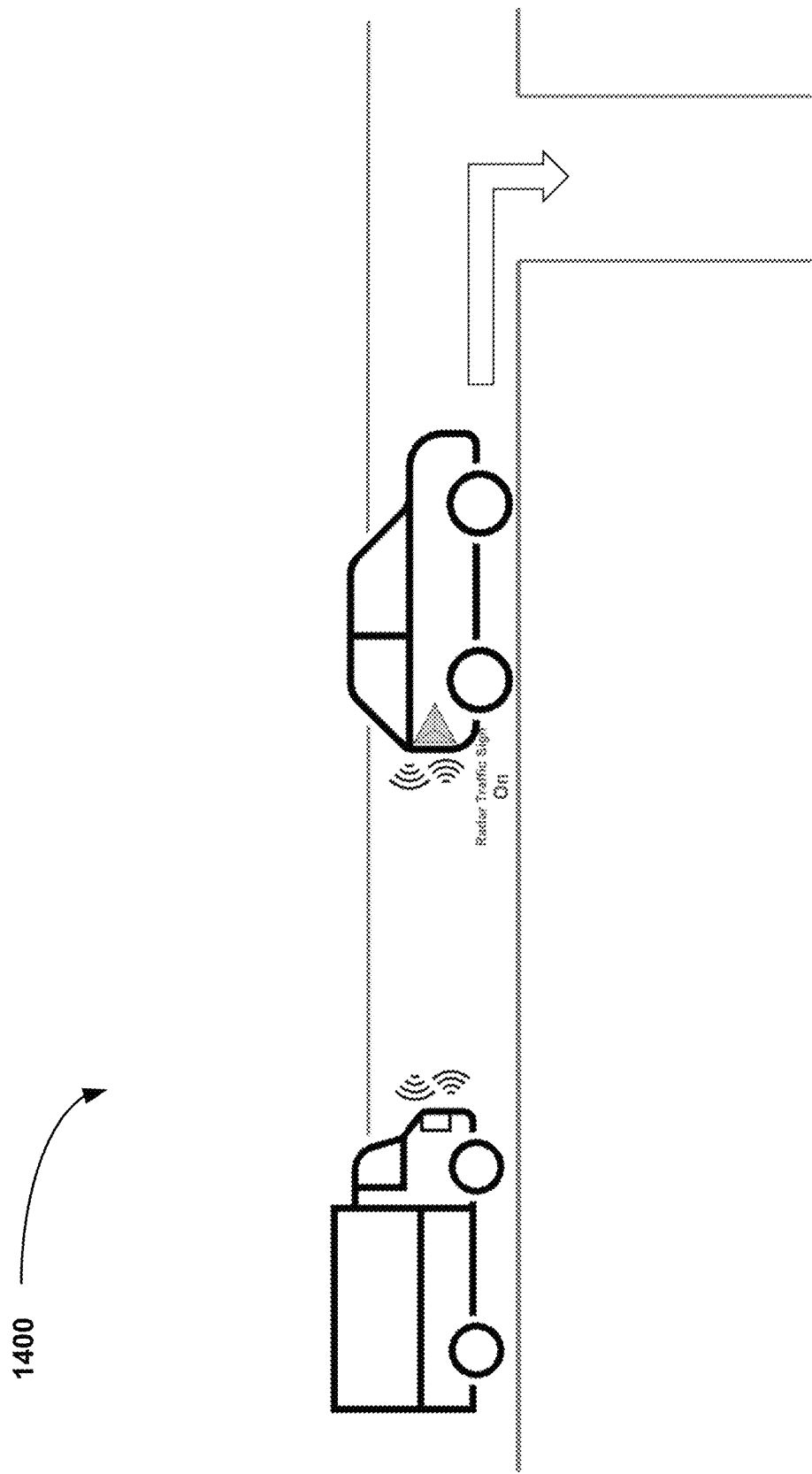
FIGS. 14 and 15 illustrate examples of radar traffic warning signaling, in accordance with some embodiments.
Figure 15:
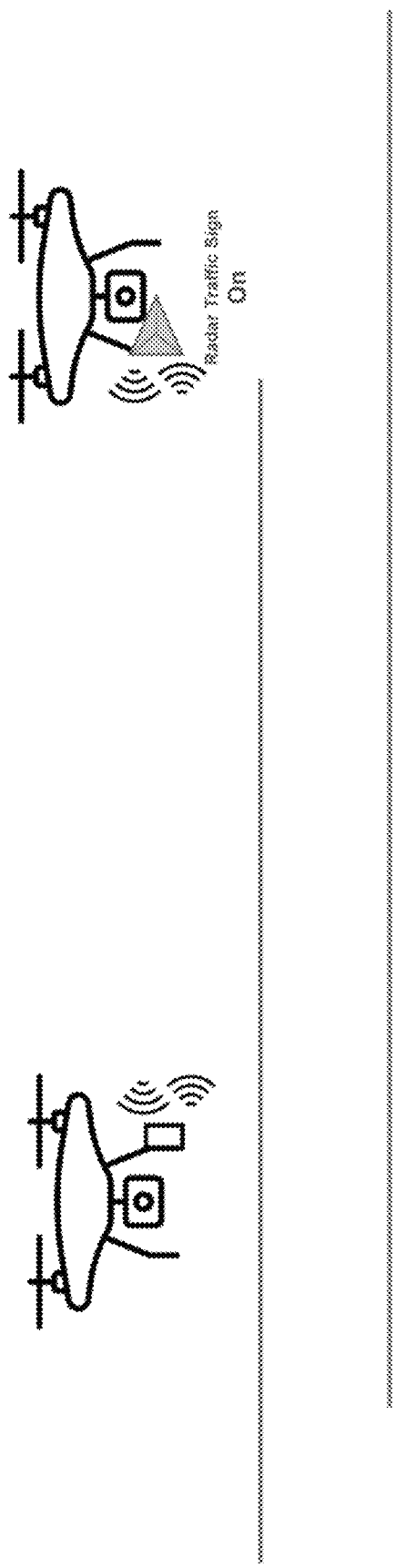

In some embodiments, a radar traffic sign can be used in automobiles and drones, especially for autonomous applications. Many small vehicles or drones have a low RCS, and a radar traffic sign can be applied as a radar traffic warning sign. FIGS. 14 and 15 illustrate examples of radar traffic warning signaling 1400, 1500, in accordance with some embodiments. FIG. 14 applies to autonomous vehicles; FIG. 15 applies to unmanned aerial drones. When a vehicle or drone is to stop or decreases its speed, it can turn on its radar traffic sign as a warning sign and informs its situation to others. This radar sign can be installed in different locations of a vehicle or drone with different configurations and states to increase safety.

Implementation of Radar Traffic Stop Sign at Road Intersection

In some embodiments, an FMCW long-range radar in a vehicle with at least one transmitter antenna and one receiver antenna can detect a radar traffic stop sign from a distance of at least approximately 200 m. The radar traffic stop sign may have two ON and OFF states, and these states can be changed with a specific rate. The radar sensor in a vehicle may be configured to detect the radar stop sign from all signatures of the received signals including amplitude and/or ON and OFF frequency rate.

Figure 16A:
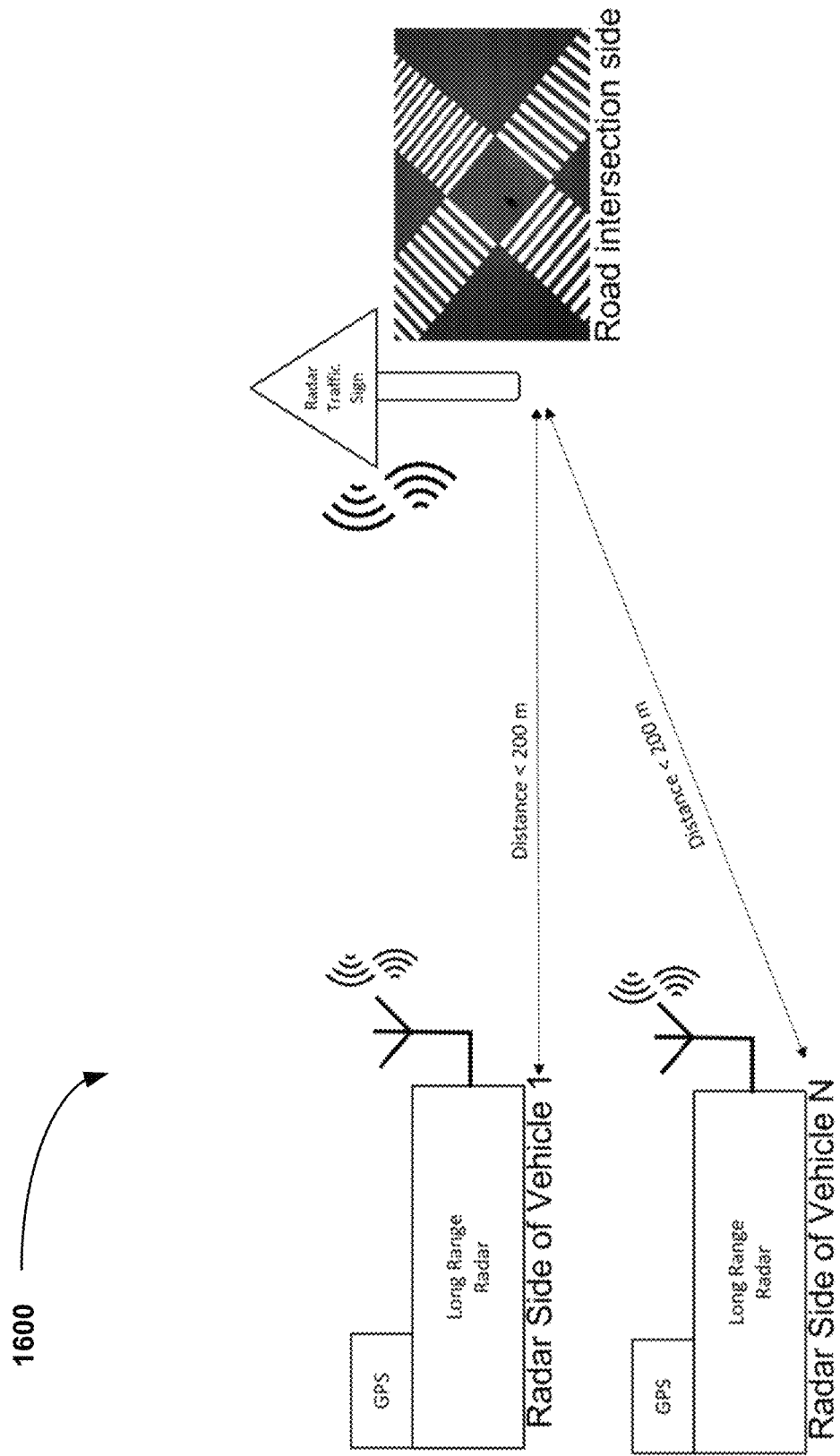
FIG. 16A illustrates an example of a configuration of a radar stop sign and a long-range radar in a vehicle, in accordance with some embodiments.

FIG. 16A illustrates an example of a configuration of a radar stop sign and a long-range radar in a vehicle 1600, in accordance with some embodiments. The position of the radar sensor is received from a Global Positioning System (GPS) for developing spatial filtering and more processing. The radar stop sign may be controlled by a separate control unit or a traffic light control unit at the intersection.

Figure 16B:
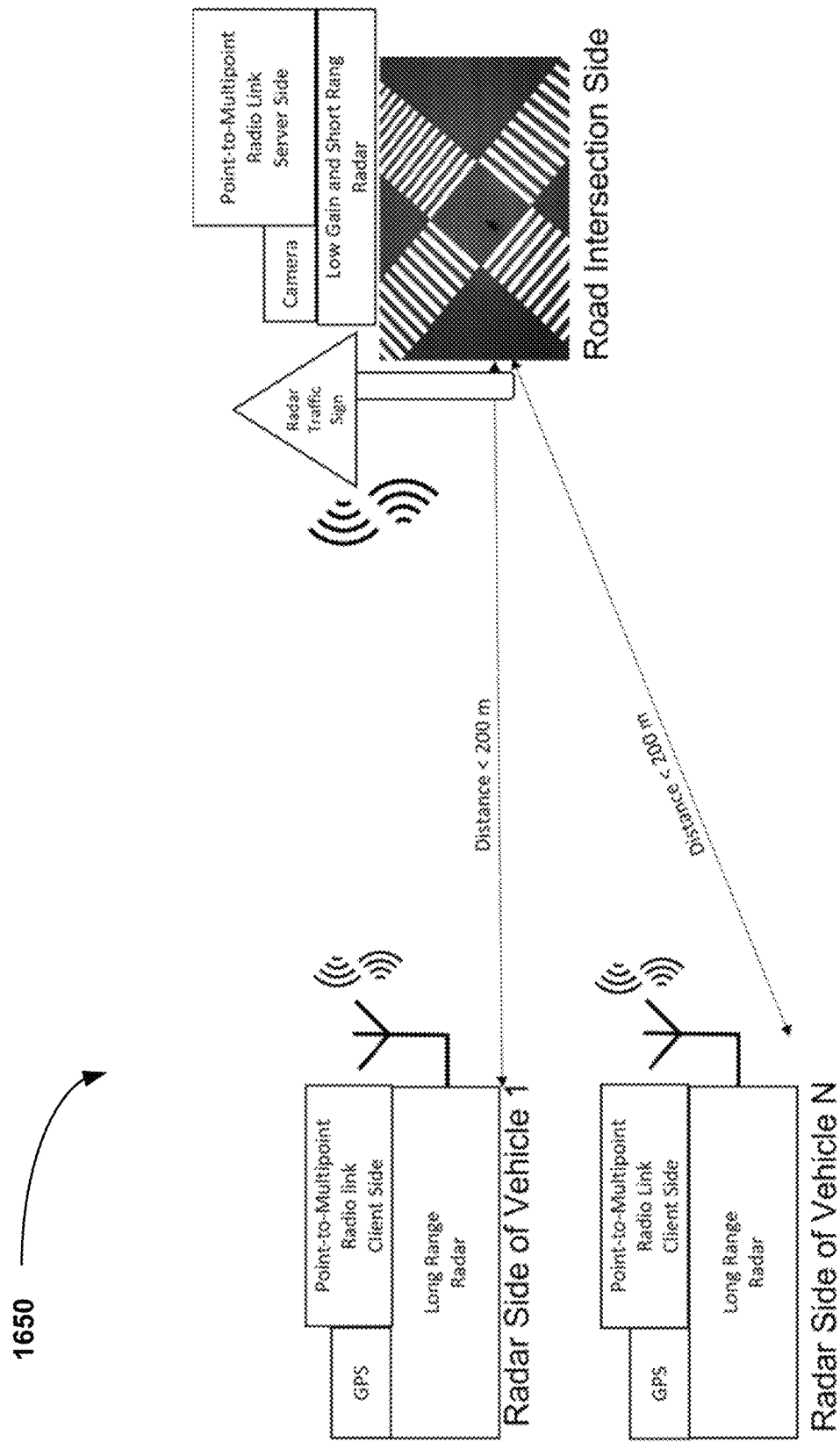
FIG. 16B illustrates another example of a configuration of the radar stop sign and a long-range radar in a vehicle, in accordance with some embodiments.

FIG. 16B illustrates another example of a configuration of the radar stop sign and a long-range radar in a vehicle 1650, in accordance with some embodiments. Using the example of FIG. 16B, the situation at an intersection can be monitored by multiple sensors including but not limited to a short-range radar and a camera. In some embodiments, a notice, or a warning message regarding the situation at the intersection (e.g., a stop state or any accident warning signal) can be sent by a point-to-multipoint radio link to all vehicles around or in proximity to the intersection.

Implementation of Radar Traffic Stop Sign at Railroad Intersection

In some embodiments, an FMCW long-range radar in a train with at least one transmitter antenna and one receiver antenna can detect a radar traffic stop sign from a distance (e.g., at least 1000 m or a suitable distance to allow the train to stop). The transmitter and receiver antennas can be any type of antennas including but not limed to patch antenna, lens antenna or other antenna types. The transmitter and/or receiver antennas may be used in a phased array configuration to achieve higher gain. The radar traffic stop sign may have two ON and OFF states, and these states can be changed with a specific rate. A radar sensor in a train may be configured to detect the radar stop sign from all signatures of the received signals including amplitude and ON and OFF frequency rate.

Figure 17A:
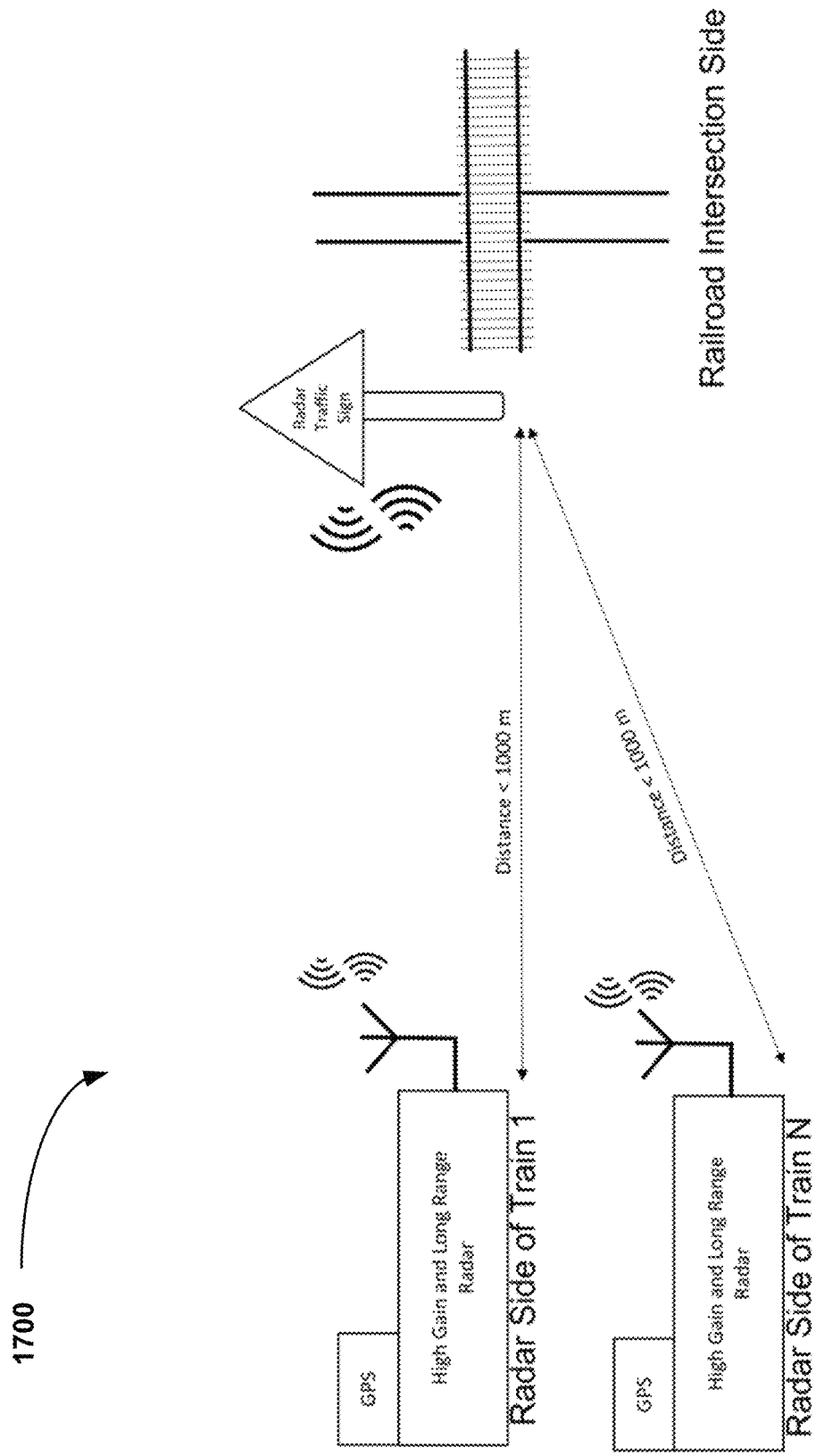
FIG. 17A illustrates an example of a configuration of a radar stop sign with a long-range radar in each train, in accordance with some embodiments.

FIG. 17A illustrates an example of a configuration of a radar stop sign with a long-range radar in each train 1700, in accordance with some embodiments. The position of the radar sensor is received from a GPS for developing spatial filtering and more processing. The radar stop sign may be controlled by a separate control unit or a traffic light control unit at the intersection.

Figure 17B:
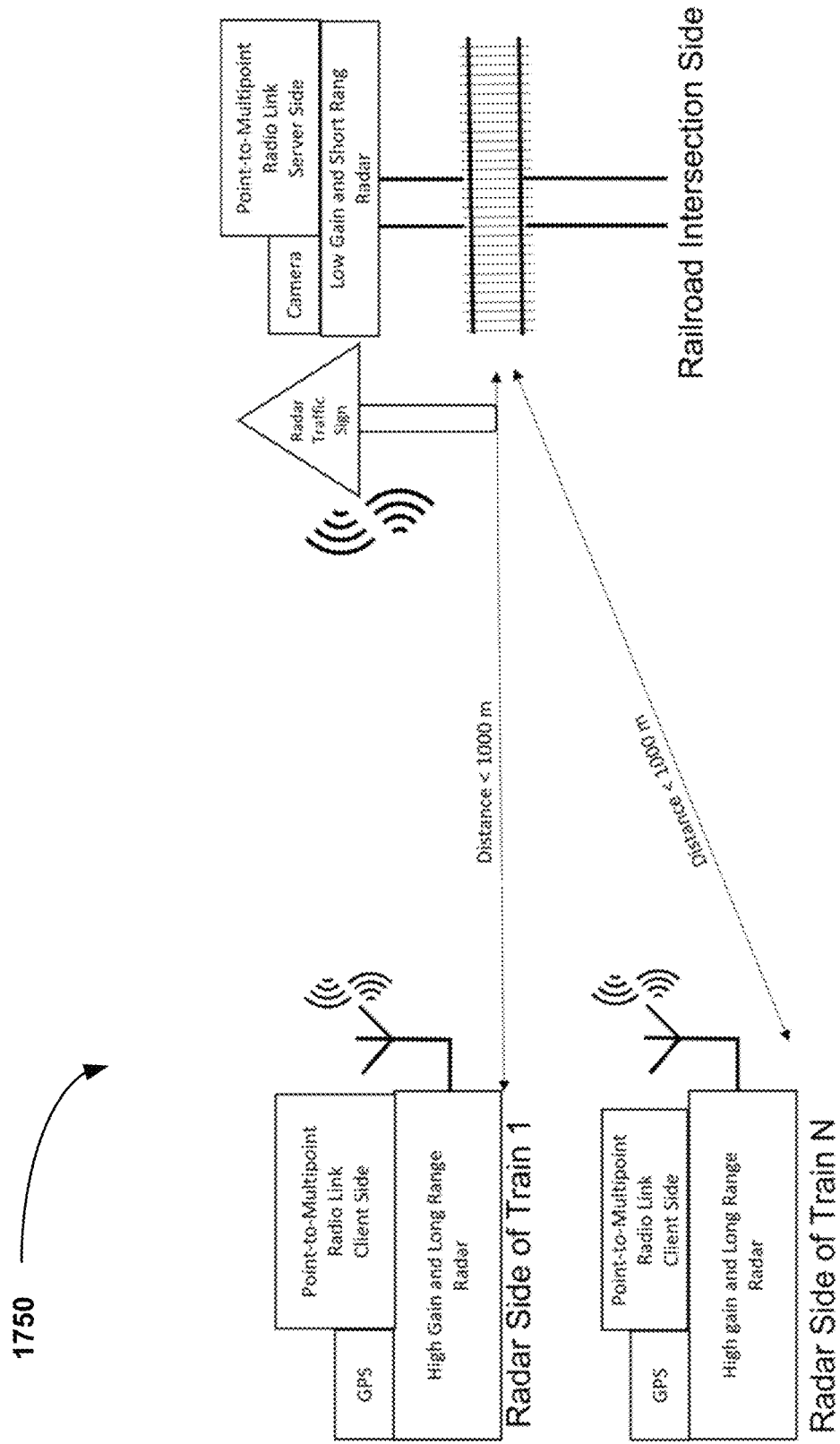
FIG. 17B illustrates another example of a configuration of the radar stop sign with a long-range radar in each train, in accordance with some embodiments.

FIG. 17B illustrates another example of a configuration of the radar stop sign with a long-range radar in each train 1750, in accordance with some embodiments. Using the example of FIG. 17B, the situation at an intersection can be monitored by multiple sensors including but not limited to a short-range radar and a camera. In some embodiments, a notice, or a warning message regarding the situation at the intersection (e.g., a stop state or any accident warning signal) can be sent by a point-to-multipoint radio link to all trains around the intersection.

Radar Traffic Sign

In some embodiments, there is provided a radar traffic sign made of smart mechanical corner reflector or an electronic radar traffic sign made of smart meta-corner reflector that operates in the ISM frequency range of approximately 24 GHz to approximately 24.25 GHz or millimeter wave frequency range approximately 76 GHz to approximately 81 GHZ. The controllable radar traffic sign has at least two states: a reflection (ON state) and not reflection (OFF state). In the ON state, the radar traffic sign works as a reflector with high RCS. In the OFF state it works as an absorber or not reflecting incident wave and has very low RCS. This sign could have different configurations and shapes including but not limited to a single plane reflector, triangular trihedral corner reflector, circular trihedral corner reflector, square trihedral corner reflector or their combinations, and sizes to increase its RCS and create different coded signatures for different traffic signs (including radar traffic stop signs). The radar traffic stop sign may have at least two states ON and OFF with a fixed ON and OFF frequency rate.

Road Intersection Application

In some embodiments, the radar traffic sign can be used for different applications in road intersections including but not limited to stop signs or accident early-warning signs. A long-range radar in a vehicle can detect radar traffic stop signs from a distance (e.g., at least approximately 200 m or any suitable distance sufficient for a vehicle to come to a stop) based on the amplitude, ON and OFF frequency rate, or other signatures of the received signals.

Railroad Intersection Application

In some embodiments, the radar traffic sign can be used for different applications in railroad intersections including but not limited to stop signs or accident early-warning signs. A high-gain and long-range radar in a train can detect radar traffic stop signs from a distance (e.g., at least approximately 1000 m or any suitable distance sufficient for a train to come to a stop) based on the amplitude, ON and OFF frequency rate, or other signatures of the received signals.

Vehicle and Drone Application

In some embodiments, the radar traffic signs can be used as stop signs or accident early-warning signs for small vehicles and drones which have low RCS. A long-range radar in a vehicle or drone can detect radar traffic stop signs from a distance (e.g., at least approximately 200 m or any suitable distance sufficient for the vehicle or drone to come to a stop) based on the amplitude, ON and OFF frequency rate, or other signatures of the received signals. The radar traffic sign can be installed in different locations of a vehicle or drone with different configurations and states to increase safety.

Real-Time Monitoring and Accident Early-Warning System for Road Intersection

In some embodiments, a current situation at a road intersection can be monitored with multiple sensors including but not limited to a short-range radar and a camera. An accident early-warning signal and intersection situation may be monitored in other vehicles through a point-to-multipoint radio link from a distance of at least approximately 200 m or any suitable distance sufficient for the vehicle to come to a stop. The intersection situation and the early-warning signal broadcasted from point-to-multipoint radio can be monitored in a display in front of a vehicle or played as a warning audio signal so the people in the vehicle can be informed of the intersection situation.

Real-Time Monitoring and Early-Warning System for Railroad Intersection

In some embodiments, a current situation at a railroad intersection can be monitored with multiple sensors including but not limited to a short-range radar and a camera. An accident early-warning signal and intersection situation may be monitored in other trains through a point-to-multipoint radio link from a distance of at least approximately 1000 m or any suitable distance sufficient for the train to come to a stop. The intersection situation and the early-warning signal broadcasted from point-to-multipoint radio can be monitored in a display in front of a train or played as a warning audio signal so the train deriver can be informed of the intersection situation.

Road, Street, and Highway Construction

In some embodiments, a radar traffic sign with proper RCS can be used to provide an early-warning signal to the approaching vehicles for any road, street, or highway constructions. The vehicles detect radar traffic stop signs from a distance (e.g., at least approximately 200 m or any suitable distance sufficient for the vehicle to come to a stop) based on the amplitude, ON and OFF frequency rate, or other signatures of the received signals. The radar traffic sign can be installed in different locations of a road, street or highway with different configurations and states to increase safety.

Call Flow Diagram for Radar Traffic Sign

The response of a vehicle to an early-warning situation can be implemented in several sequences. One example occurs when a vehicle receives a radar traffic stop sign detection from its radar sensor. If the broadcasting link also confirms the warning signal, the vehicle may be immediately transitioned to a stop state. If the radio link does not confirm the warning situation, the vehicle may decrease its speed and check the signals again after a specific amount of time. If the warning signal is still available, the vehicle may then stop completely. When the hazardous situation is removed, the vehicle can start driving based on the inverse sequences.

Figure 18:
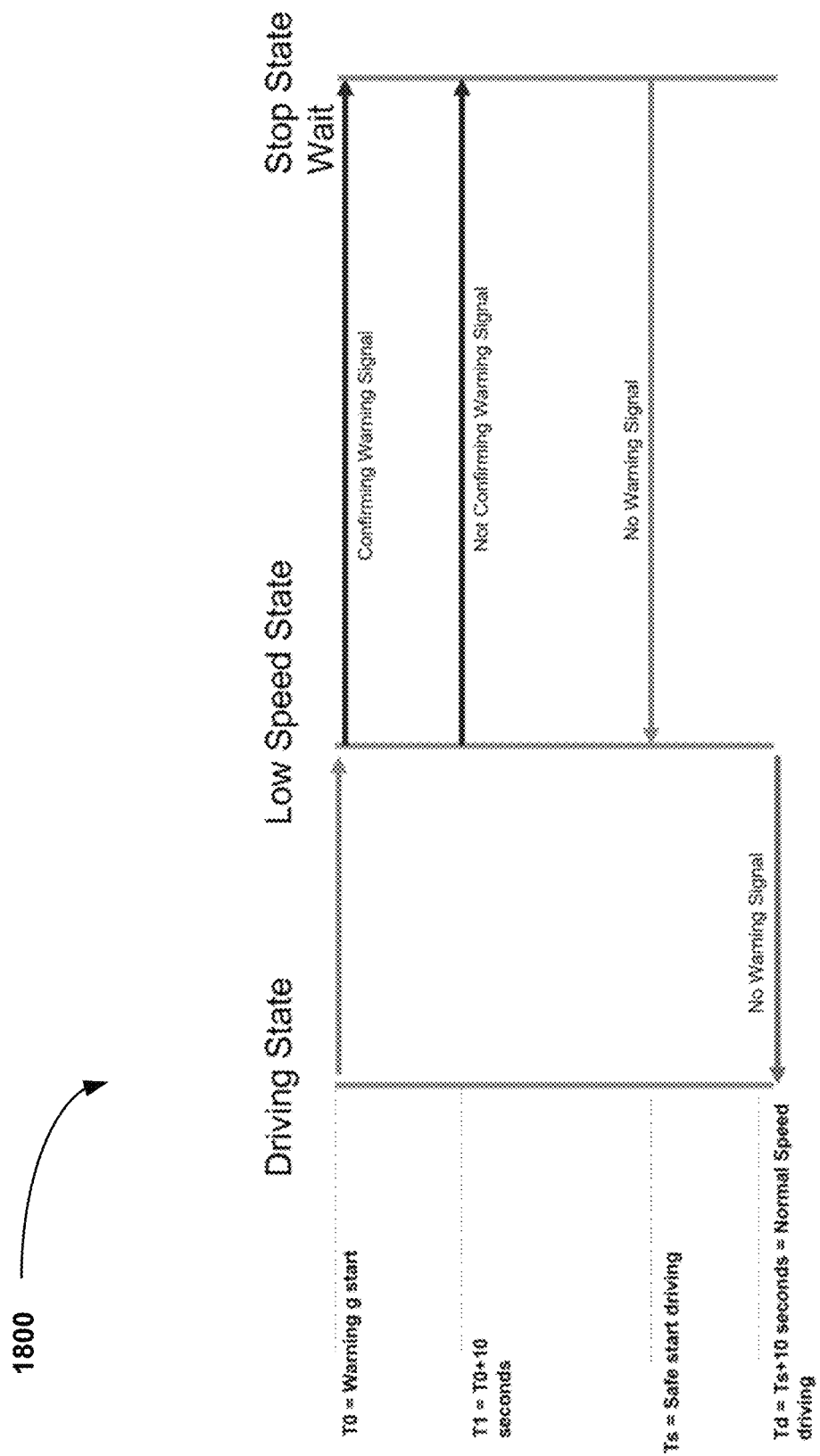
FIG. 18 illustrates, in a call flow diagram, an example of a protocol for controlling a driving state of a vehicle, in accordance with some embodiments.

FIG. 18 illustrates, in a call flow diagram, an example of a protocol for controlling a driving state of a vehicle 1800, in accordance with some embodiments. The vehicle starts to decrease its speed after receiving a warning signal from either a radar or a radio link. If both radar and radio links confirm the warning situation, the vehicle is to stop immediately. If just one of them confirm the warning situation, the vehicle stops after a specific safe period of time (for example 10 seconds) and waits until the warning signal is removed from both radar and radio link. In this time, vehicle may start driving with a slow and safe speed. If the situation is safe and there is not any warning signal, the vehicle may then proceed with normal driving operations after a specific period of time (for example 10 seconds).

Figure 19:
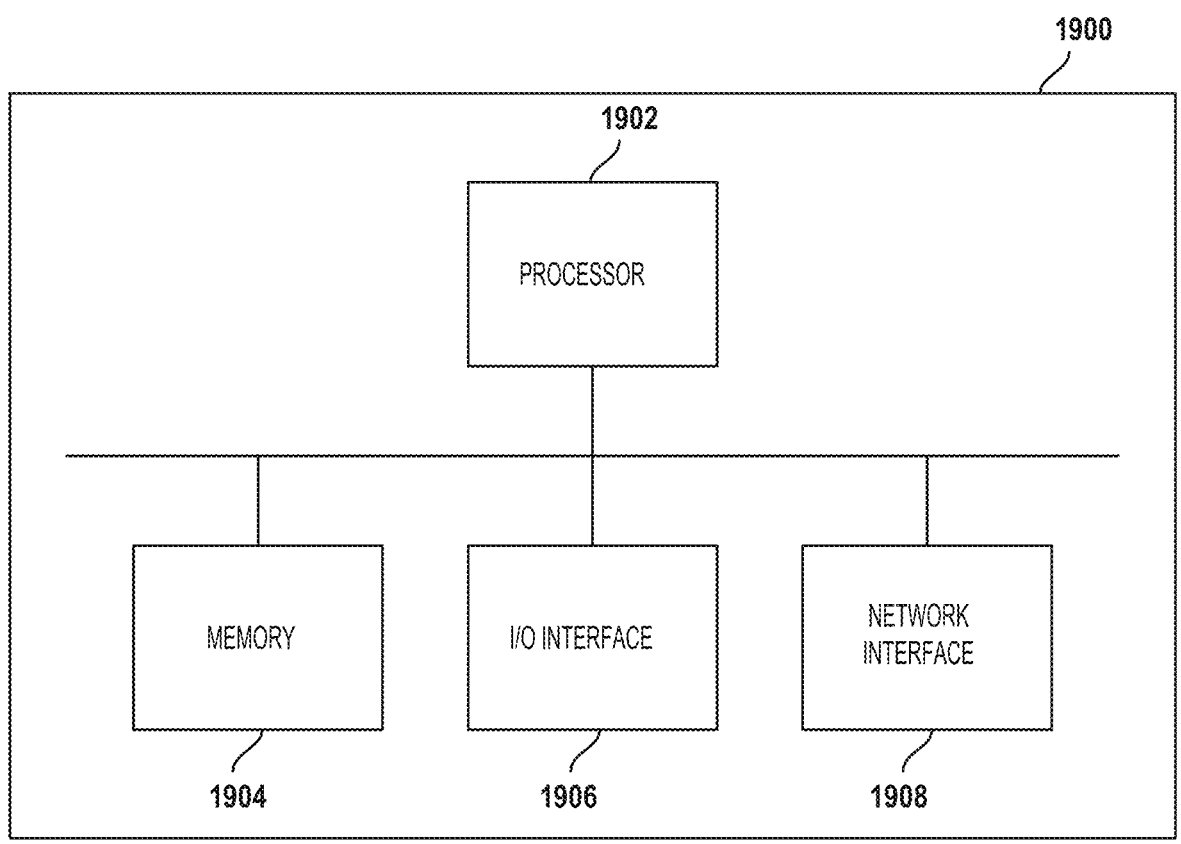
FIG. 19 is a schematic diagram of a computing device such as a server or other computer in a device.

FIG. 19 is a schematic diagram of a computing device 1900 such as a server or other computer for processing, control, interface, or monitoring in a device. As depicted, the computing device includes at least one processor 1902, memory 1904, at least one I/O interface 1906, and at least one network interface 1908.

Processor 1902 may be an Intel or AMD x86 or x64, PowerPC, ARM processor, GPU, DSP, FPGA, CPLD, or the like. Memory 1904 may include a suitable combination of computer memory that is located either internally or externally such as, for example, random-access memory (RAM), read-only memory (ROM), compact disc read-only memory (CDROM).

Each I/O interface 1906 enables computing device 1900 to interconnect with one or more input devices, such as a keyboard, mouse, camera, touch screen and a microphone, or with one or more output devices such as a display screen and a speaker.

Each network interface 1908 enables computing device 1900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX, 5G), SS7 signaling network, fixed line, local area network, wide area network, and others.

The foregoing discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A motorized radar traffic sign comprising multiple planes to shape a corner reflector, each plane comprising at least one of:
   an electrically conductive material; or
   a non-electrically conductive material having inner walls plated with an electrically conductive material
   a motor to rotate the corner reflector, wherein when the corner reflector is aligned to a radar the corner reflector is in an ON state, and wherein when the corner reflector is not aligned to the radar the corner reflector is in an OFF state, and wherein the motor rotates the corner reflector at different rotations per minute (RPM) to alter an ON and OFF frequency rate of the motorized radar traffic sign wherein different frequency rates represent different applications.

2. The motorized radar traffic sign as claimed in claim 1, wherein the corner reflector comprises at least one of:
   a triangular trihedral corner reflector;
   a circular trihedral corner reflector; or
   a square trihedral corner reflector.

3. The motorized radar traffic sign as claimed in claim 1, wherein the electrically conductive material comprises at least one of:
   metal alloy;
   aluminum;
   copper;
   gold; or
   silver.

4. The motorized radar traffic sign as claimed in claim 1, wherein the non-electrically conductive material comprises at least one of:
   three-dimensional printer material; or
   non-three-dimensional printer material.

5. The motorized radar traffic sign as claimed in claim 1, wherein the radar traffic sign operates in a frequency range of at least one of:
   approximately 24 GHz to approximately 24.25 GHZ;
   approximately 76 GHz to approximately 77 GHZ; or
   approximately 77 GHz to approximately 81 GHz.

6. The motorized radar traffic sign as claimed in claim 1, wherein the sign is used as a yield or stop sign at road intersections.

7. The motorized radar traffic sign as claimed in claim 1, wherein the sign is used as a yield or stop sign in vehicles or drones.

8. The motorized radar traffic sign as claimed in claim 1, wherein the sign is used as a hazard sign in road, street, or highway construction.

9. The motorized radar traffic sign as claimed in claim 1, wherein the sign is coupled with a point-to-multipoint radio link for monitoring a situation and for broadcasting an early-warning signal to other vehicles.

* * * * *